United States Patent [19]
Horst et al.

[11] Patent Number: 5,329,629
[45] Date of Patent: Jul. 12, 1994

[54] APPARATUS AND METHOD FOR READING, WRITING, AND REFRESHING MEMORY WITH DIRECT VIRTUAL OR PHYSICAL ACCESS

[75] Inventors: Robert W. Horst, Champaign, Ill.; I. Ko Yamamoto, Santa Clara; Ajay K. Shah, San Jose, both of Calif.

[73] Assignee: Tandem Computers Incorporated, Cupertino, Calif.

[21] Appl. No.: 375,428

[22] Filed: Jul. 3, 1989

[51] Int. Cl.$^5$ .............................................. G06F 1/08
[52] U.S. Cl. ................... 395/425; 395/400; 364/255.7; 364/256.3; 364/256.4; 364/955.5; 364/DIG. 1; 364/DIG. 2; 365/49; 365/238.5
[58] Field of Search .................... 395/400, 425; 364/DIG. 1, DIG. 2, 255.7, 256.3, 256.4, 955.5; 365/238.5, 49

[56] References Cited

U.S. PATENT DOCUMENTS

| | | | |
|---|---|---|---|
| 3,893,084 | 7/1975 | Kotok et al. | 364/200 |
| 4,292,674 | 9/1981 | Scheuneman | 364/DIG. 2 |
| 4,453,230 | 6/1984 | Mizoguchi et al. | 395/400 |
| 4,563,737 | 1/1986 | Nakamura et al. | 395/400 |
| 4,637,024 | 1/1987 | Dixon et al. | 371/67 |
| 4,774,653 | 9/1988 | James | 364/DIG. 1 |
| 4,774,659 | 9/1988 | Smith et al. | 395/400 |
| 4,802,084 | 1/1989 | Ikegaya et al. | 395/400 |
| 4,803,621 | 2/1989 | Kelly | 395/425 X |
| 4,920,477 | 4/1990 | Colwell et al. | 364/200 |
| 4,961,135 | 10/1990 | Uchihori | 395/400 |
| 4,985,825 | 1/1991 | Webb, Jr. et al. | 395/425 |
| 4,991,081 | 2/1991 | Bosshart | 395/425 |

FOREIGN PATENT DOCUMENTS

| | | |
|---|---|---|
| 2,193,017 | 1/1988 | Great Britian . |
| 239,359 | 9/1987 | EP . |
| 8,900,730 | 1/1989 | PCT . |
| 8,605,917 | 10/1986 | PCT . |
| 5,920,708 | 2/1985 | Japan . |

OTHER PUBLICATIONS

Shankar, Kapil, "Wait-State Remover Improves System Performance," *VLSI Systems Design*, Nov. 1986, pp. 102–104.

"CHMOS DRAM-A New Memory Alternative For Digital Signal Processing Applications," *Intel Memory Components Handbook Supplement*, 1985, pp. 1-27-6-1-279.

(List continued on next page.)

*Primary Examiner*—Joseph L. Dixon
*Assistant Examiner*—B. Peikari
*Attorney, Agent, or Firm*—Townsend and Townsend

[57] ABSTRACT

A computer memory system is provided. Received memory requests can be for addresses which are virtual or physical. The type of address is determined, and a virtual/physical bit is set and stored. At least row address bits are compared to one or more registers which contain either a virtual or a physical row address, corresponding to a row addressed by a row address latch. When there is a hit with respect to one of these registers, column address bits are used to select the requested memory element, without the necessity for a virtual-to-physical translation. When there is a miss on all registers, a physical address is obtained, either from the requested address when this is physical, or from a virtual-to-physical translation. The physical address is used to load a new row address into a row address latch. Some column address bits are changed only when there has been a miss. A refresh cycle is described, which includes reading back into a row address latch the same row address which occupied the row address latch before the refresh cycle, thus preserving locality information or structure.

22 Claims, 21 Drawing Sheets

OTHER PUBLICATIONS

"Sun-4/110. The First Supercomputing Desktop Workstation," *Electronic Engineering Times*, Feb. 8, 1988, p. T35.

Stephen A. Ward and Robert C. Zak, "Static-column RAM as Virtual Cache,".

Stephen A. Ward and Robert C. Zak, "Set-associative Dynamic Random Access Memory".

James R. Goodman and Men-chow Chiang, "The Use of Static Column RAM as a Memory Hierarchy,".

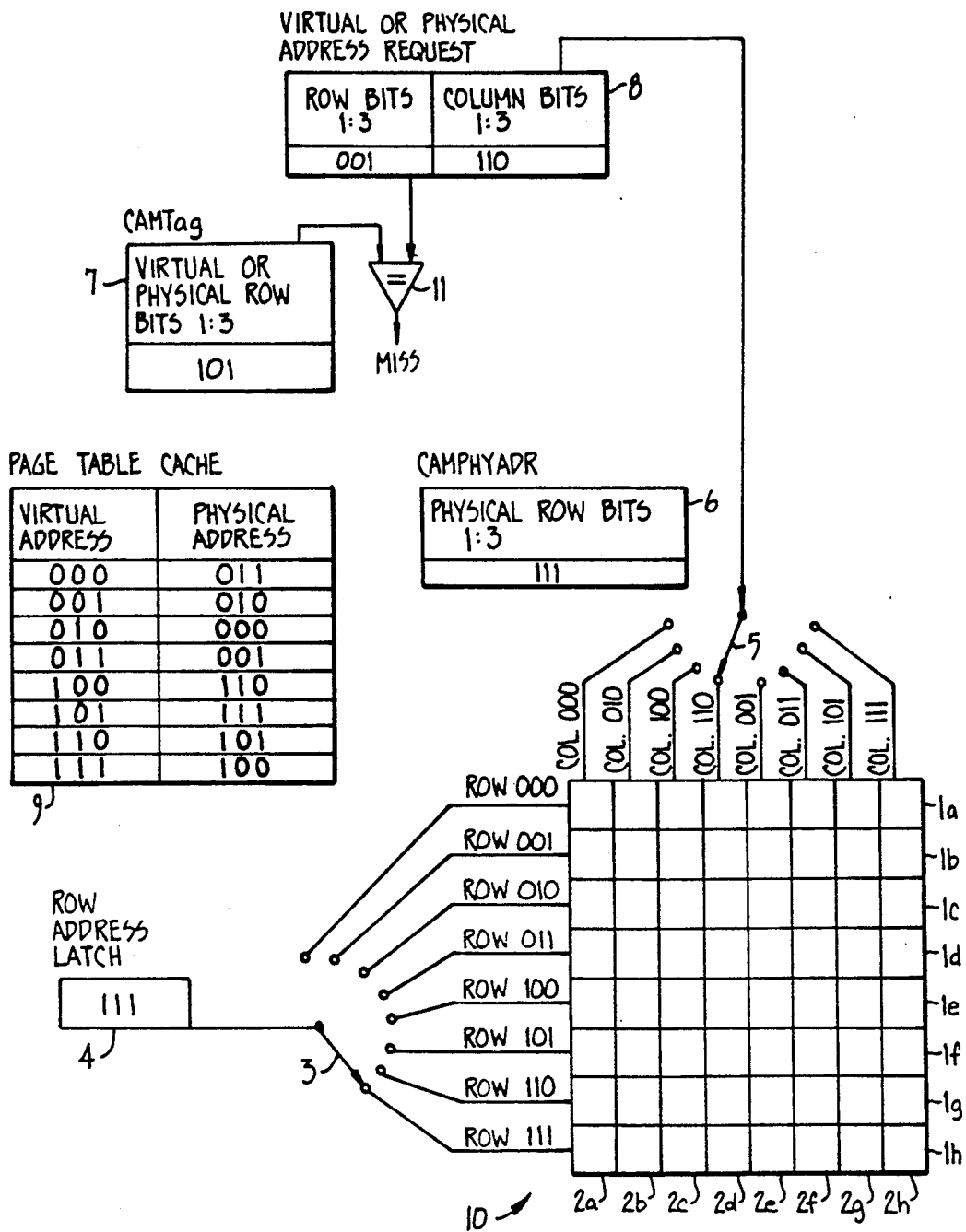
FIG._1A

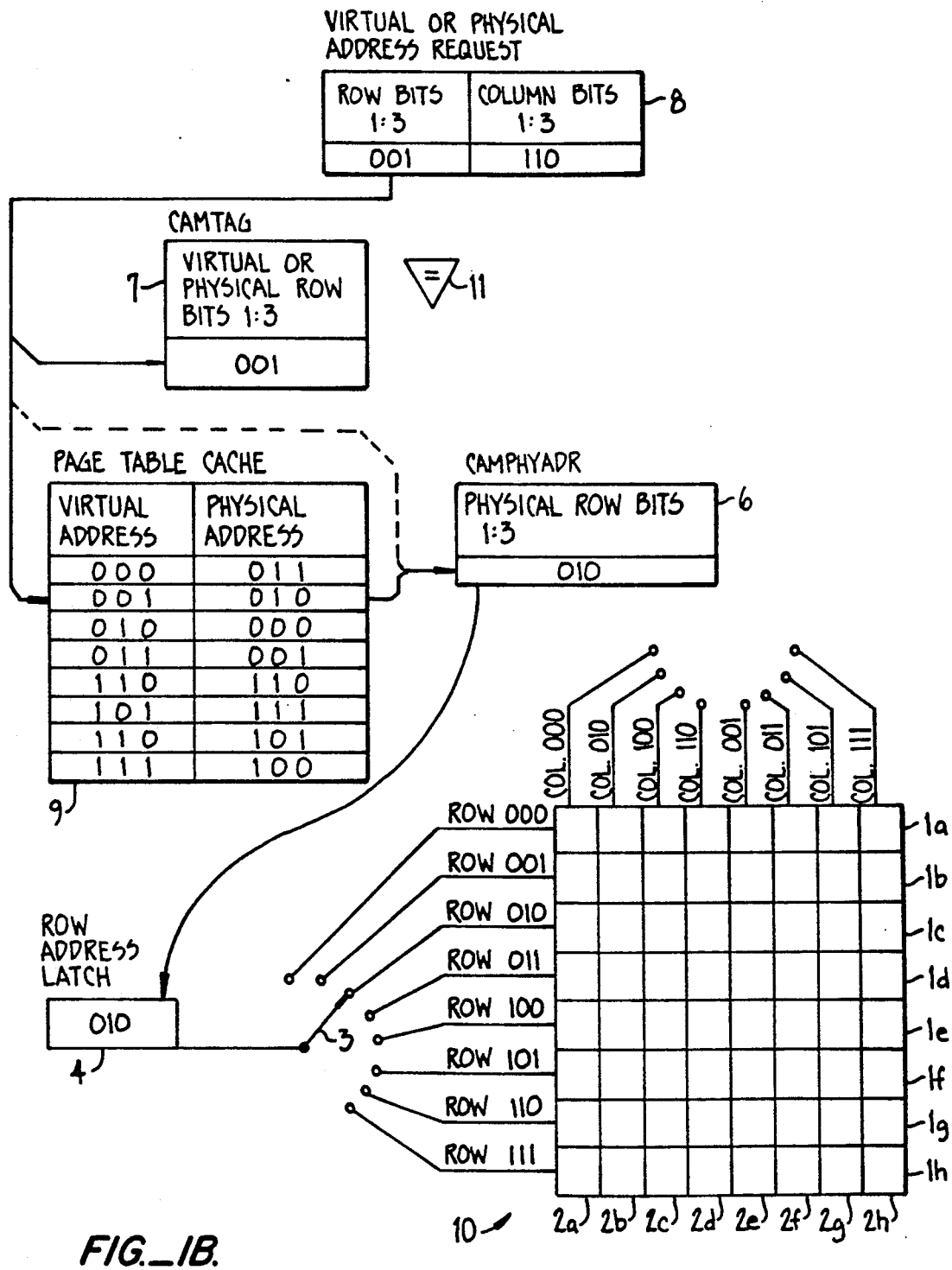
FIG._1B.

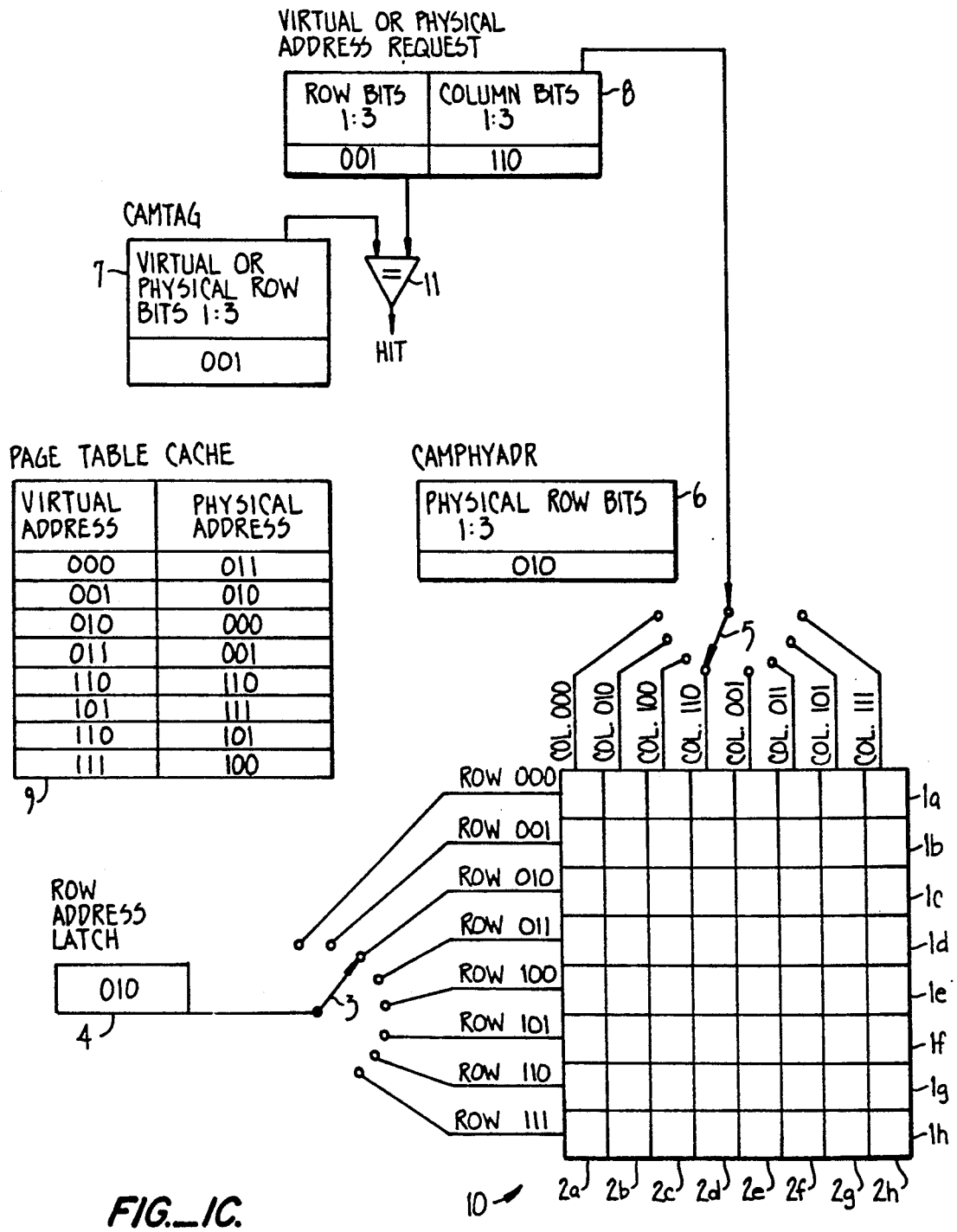
FIG._1C.

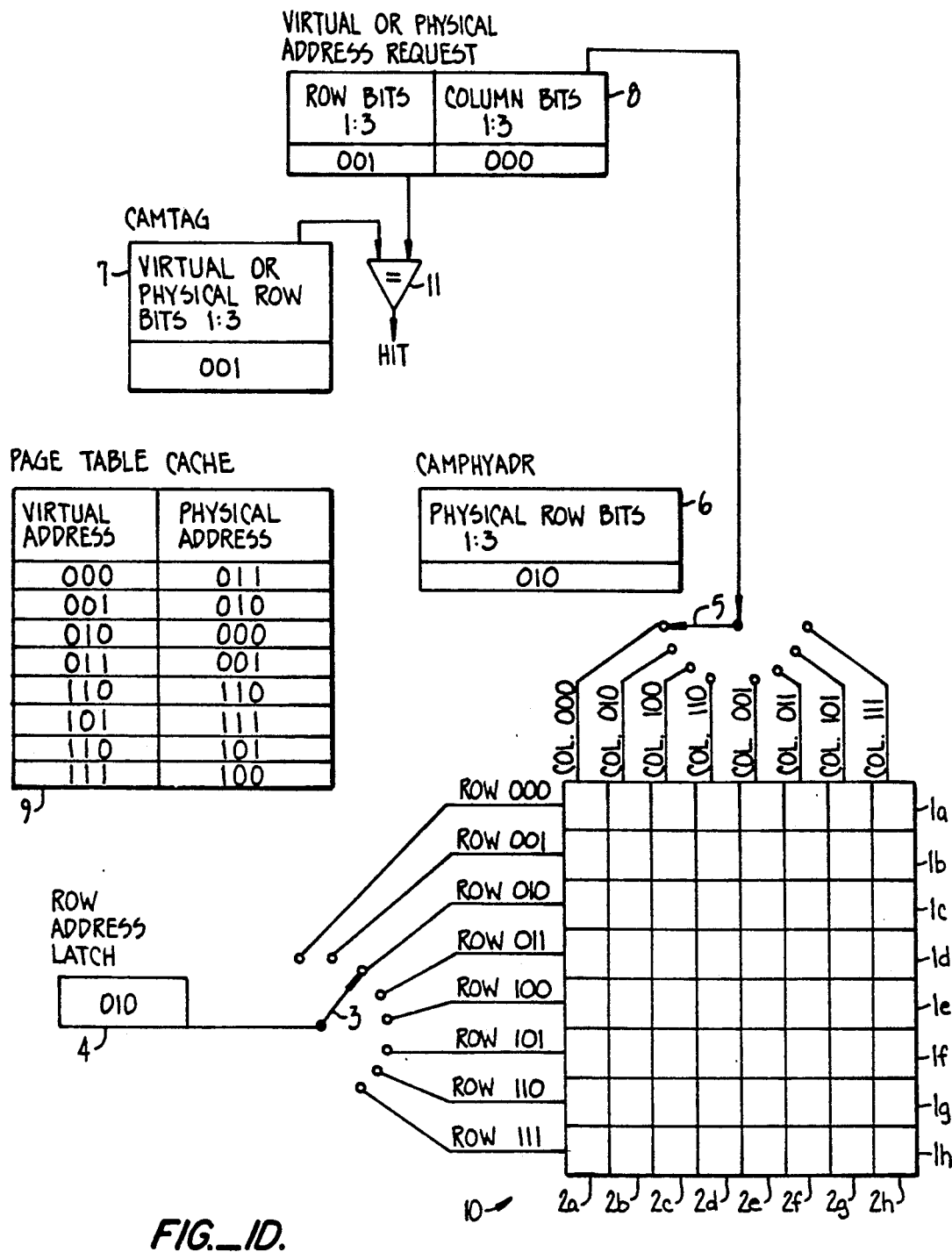
FIG._1D.

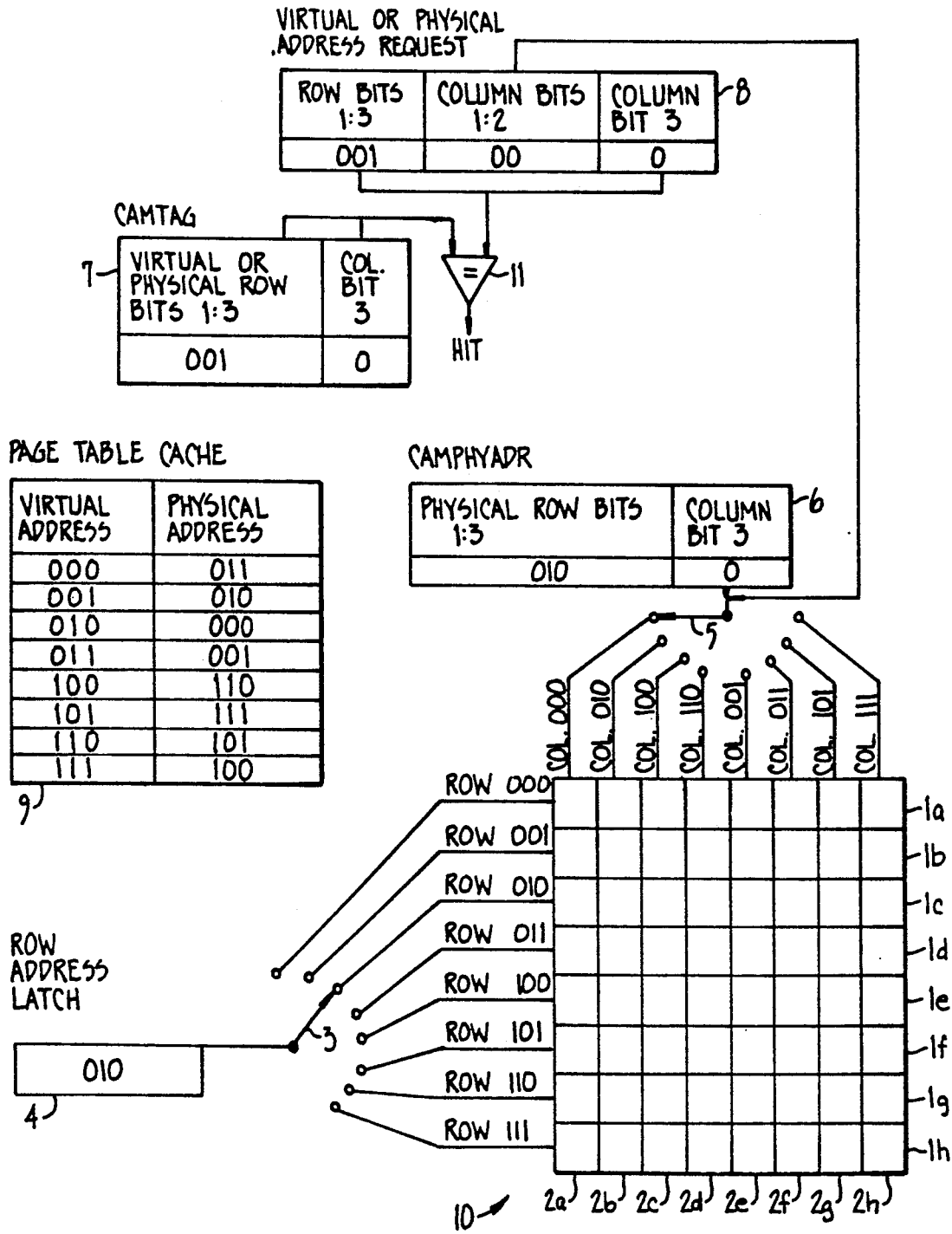
FIG._IE.

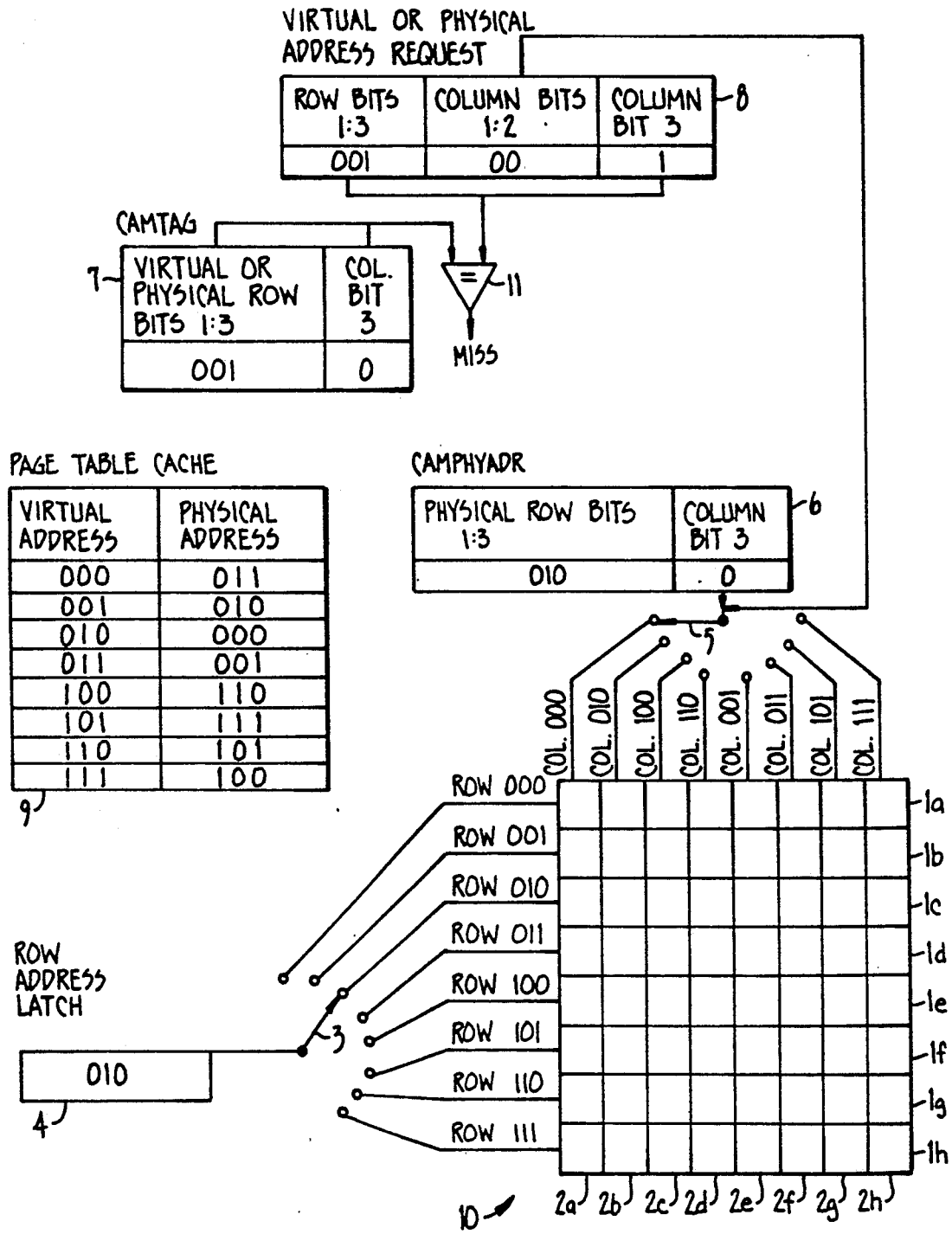
FIG._1F.

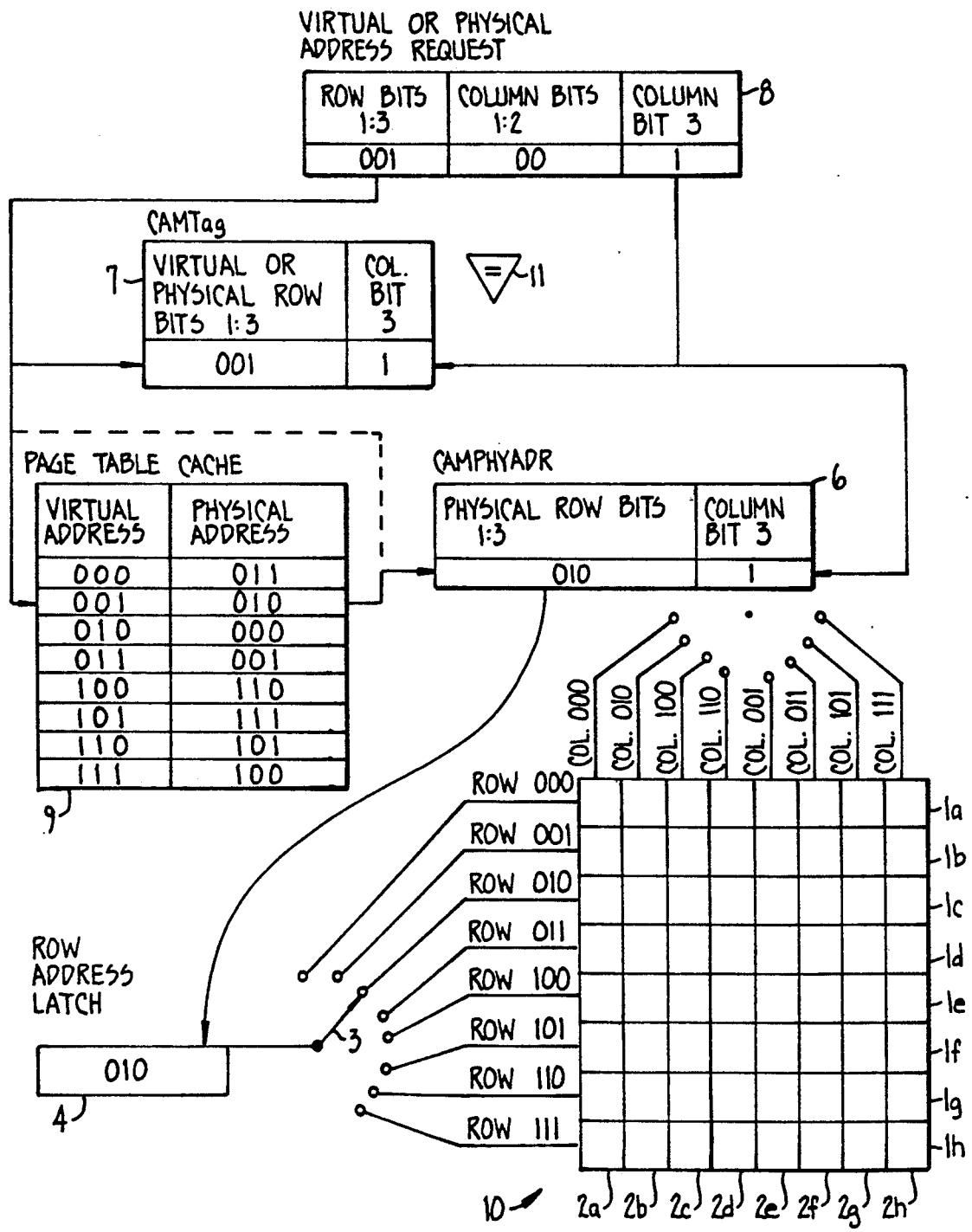
FIG._1G.

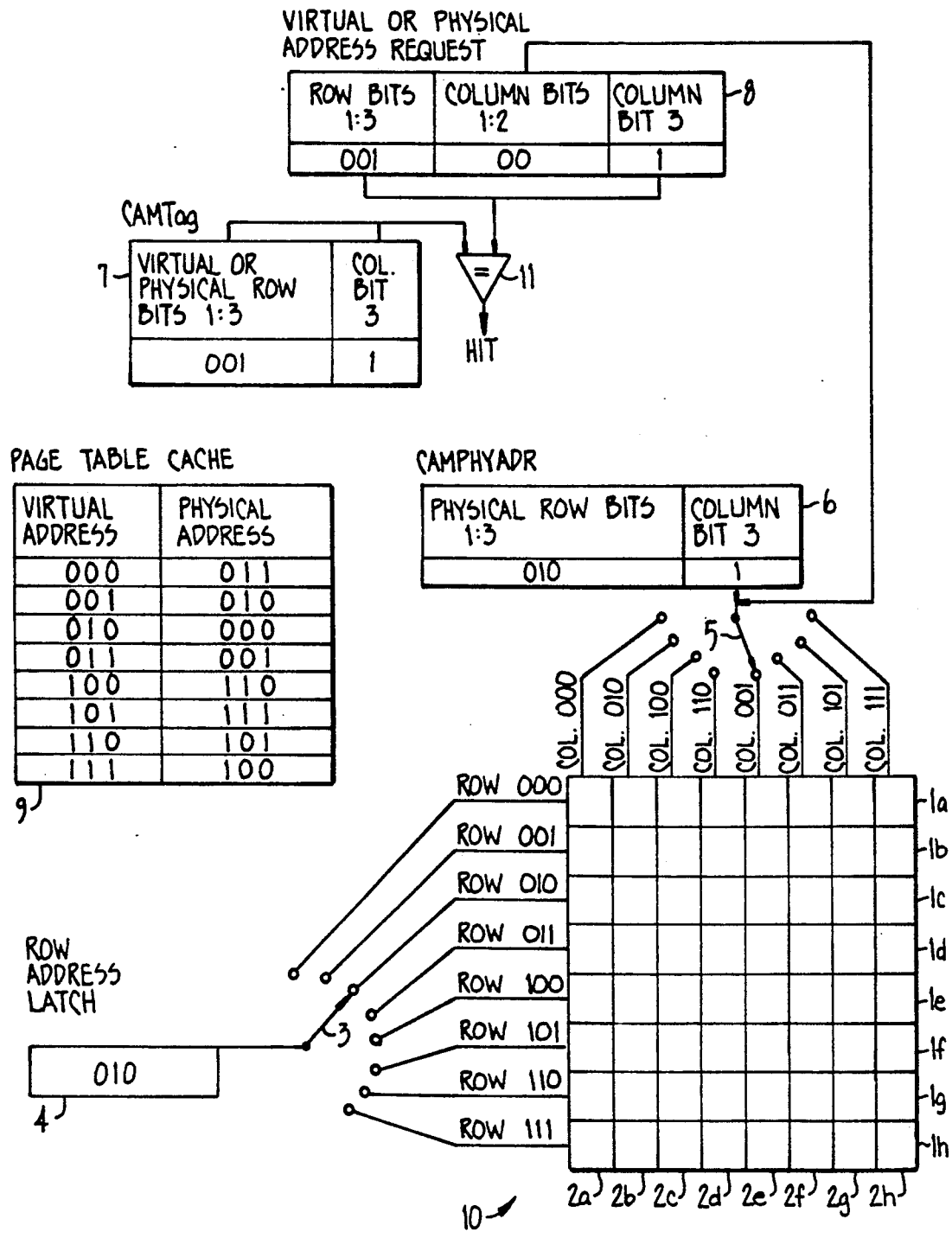
FIG._1H.

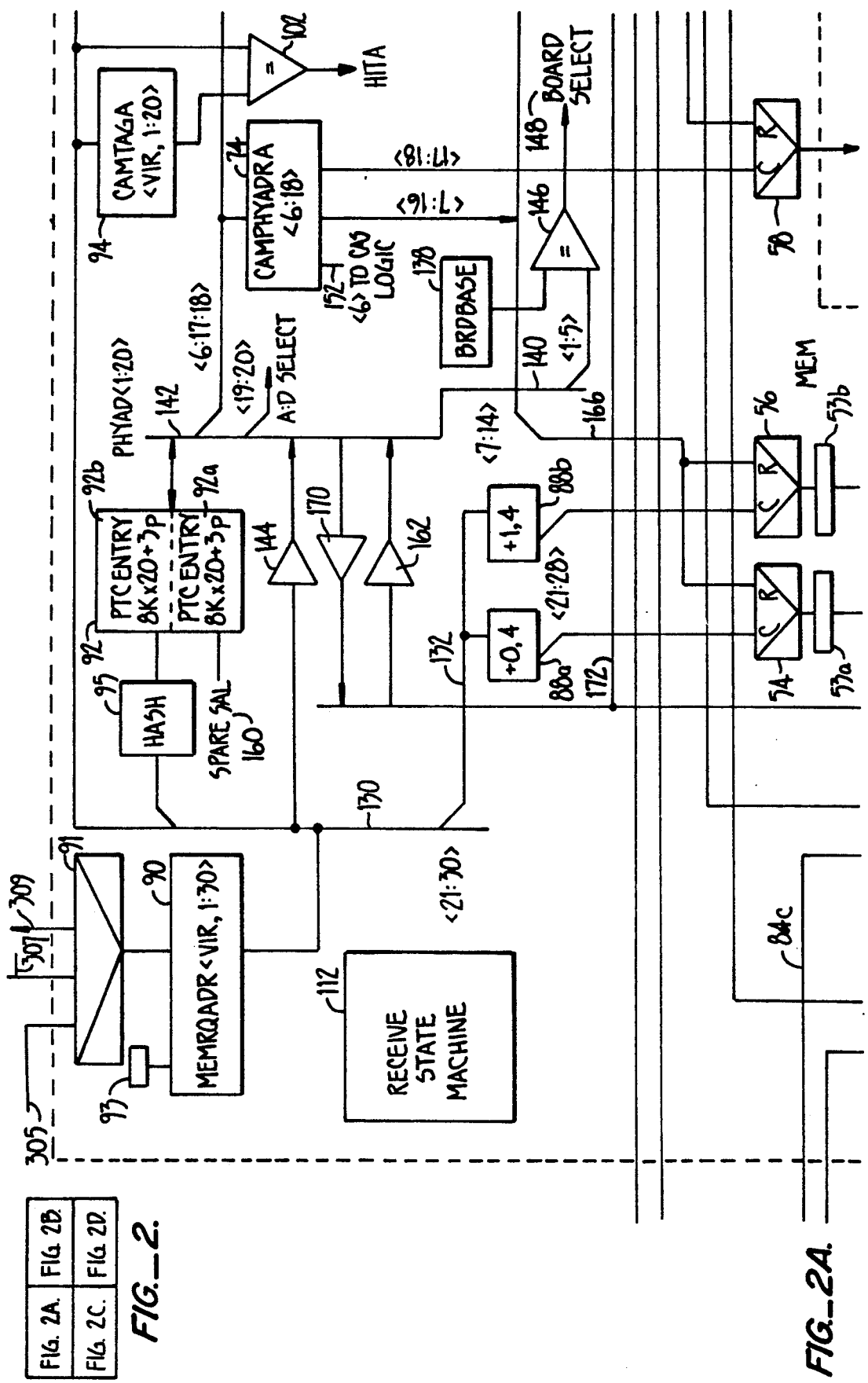

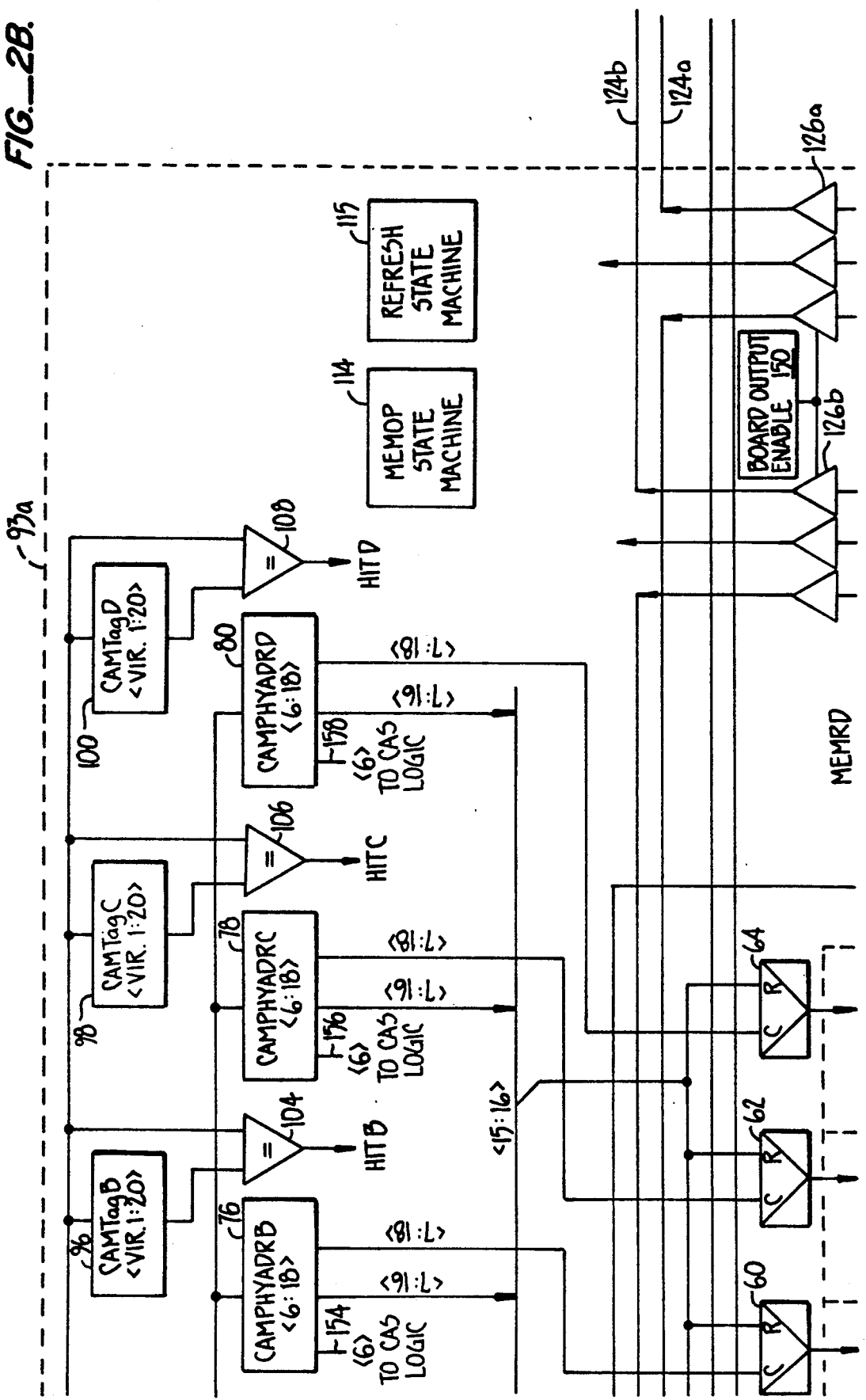
FIG._2B.

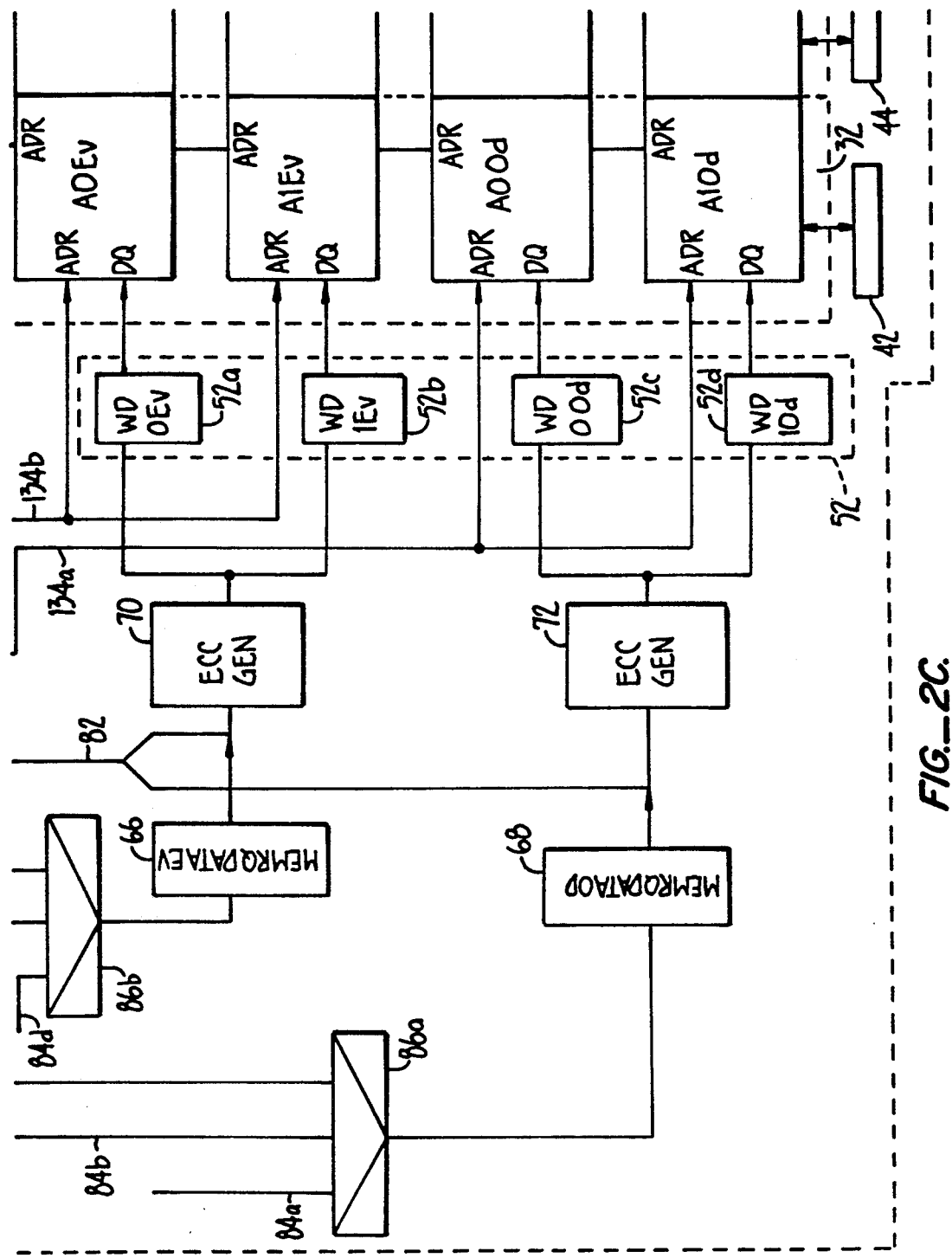

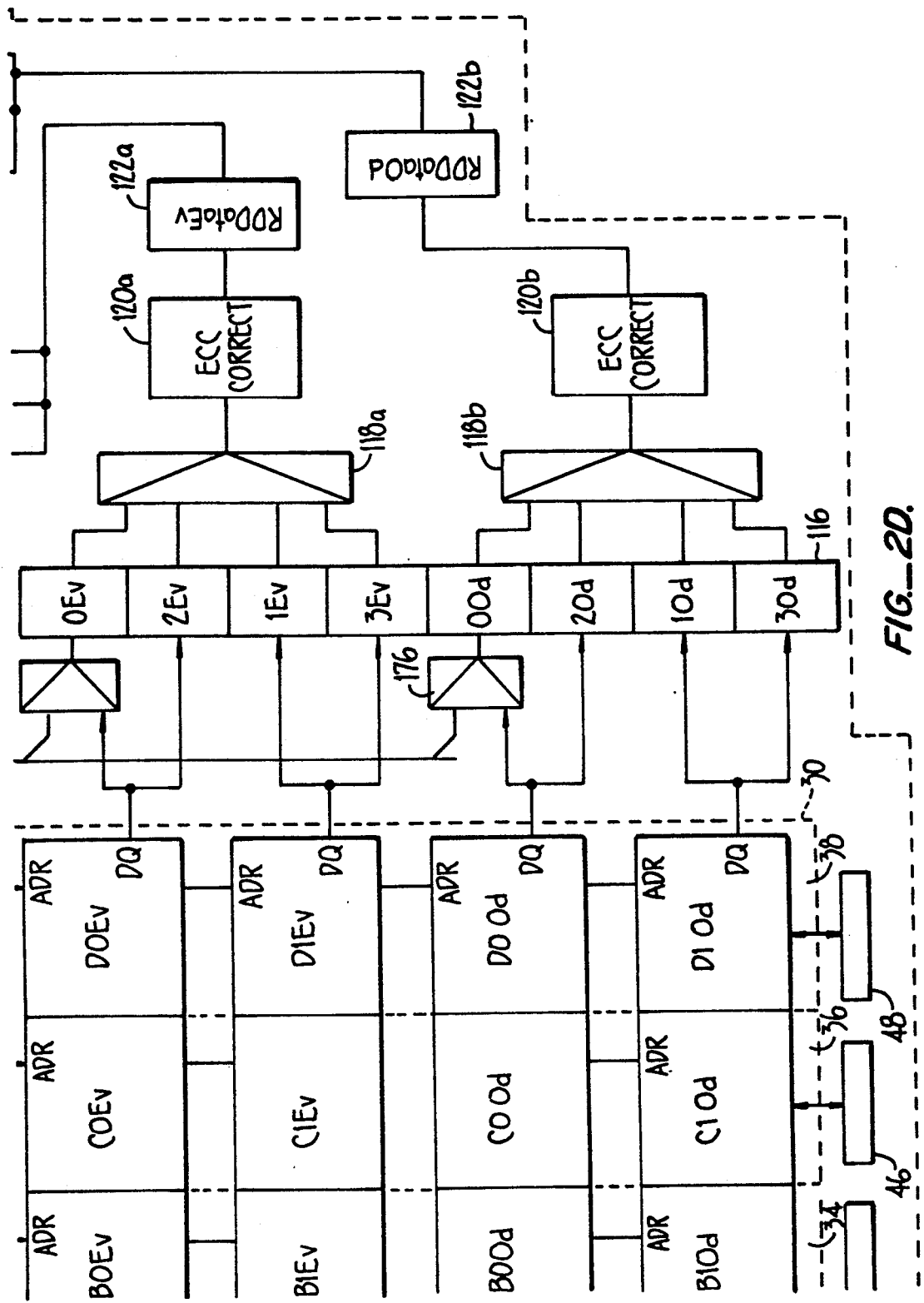
FIG._2D.

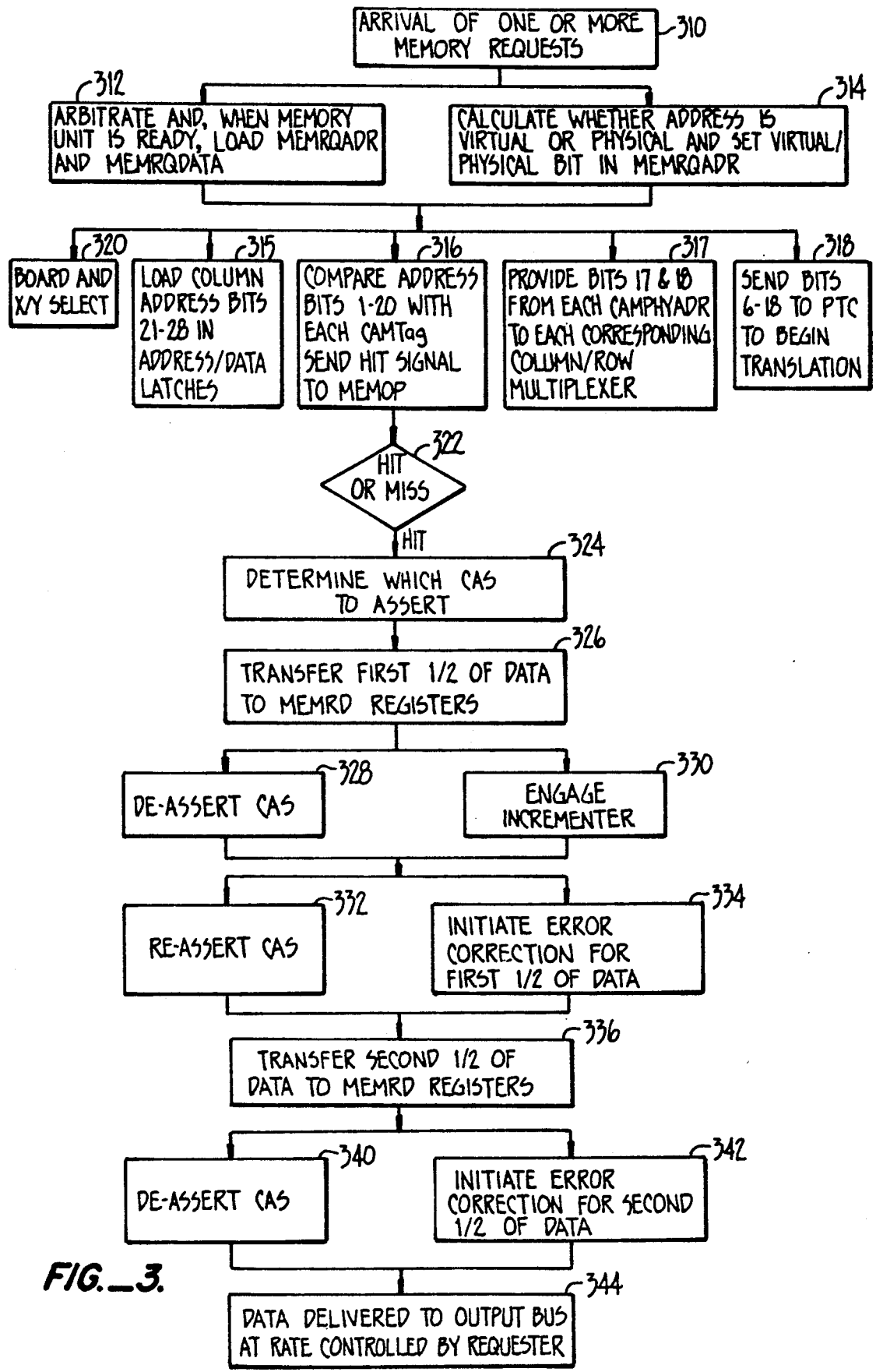
FIG._3.

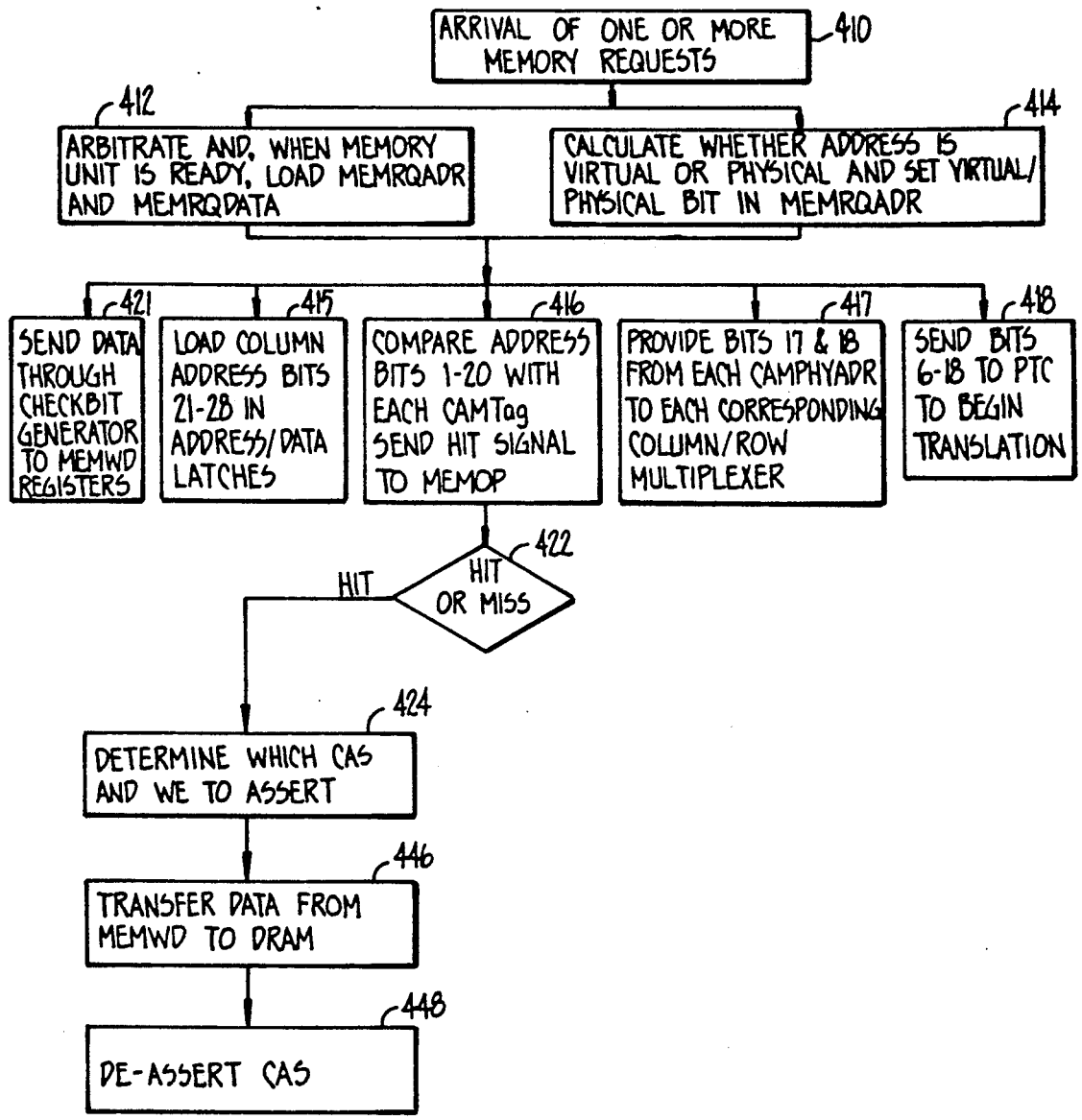
FIG._4.

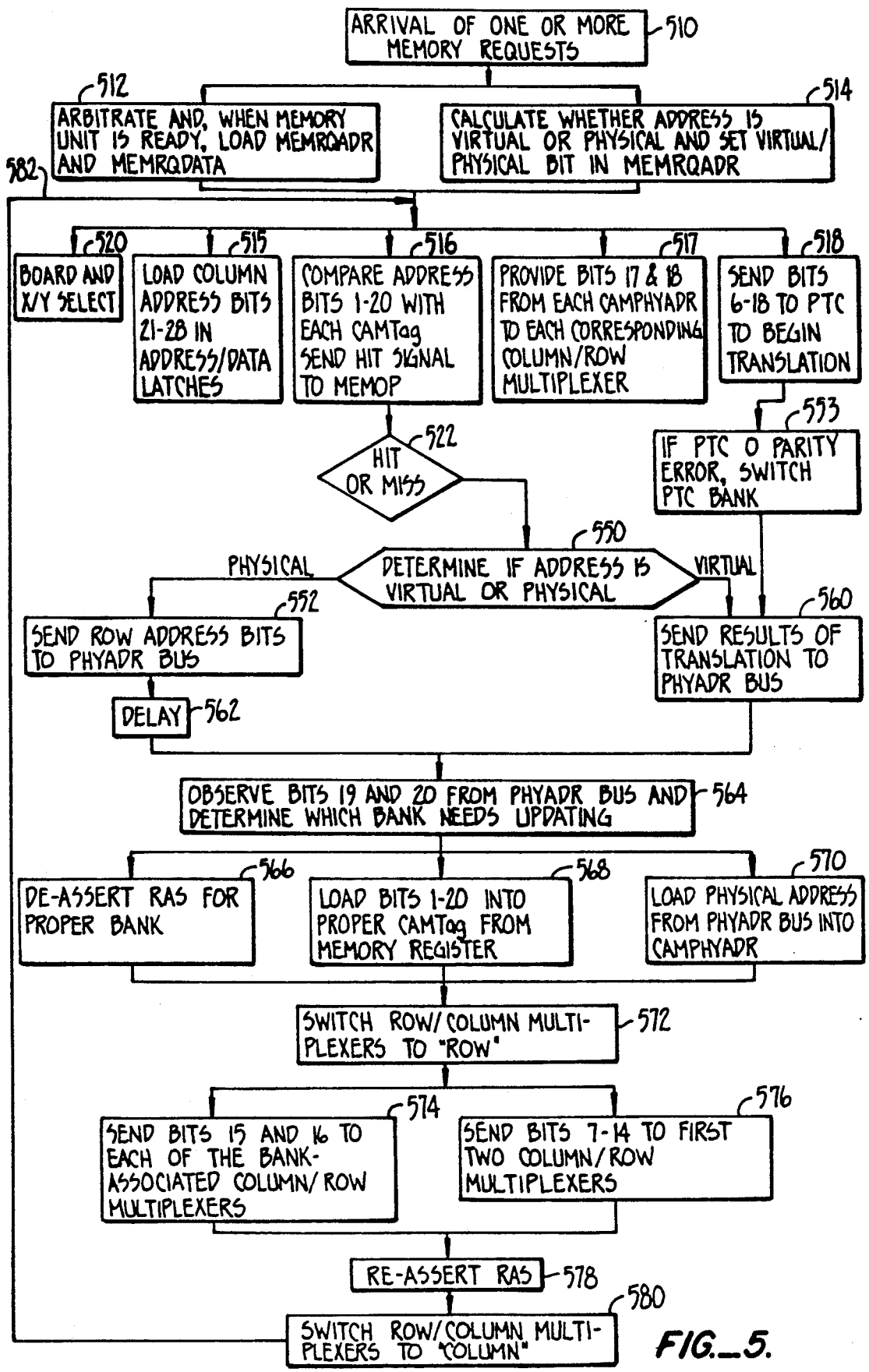
FIG._5.

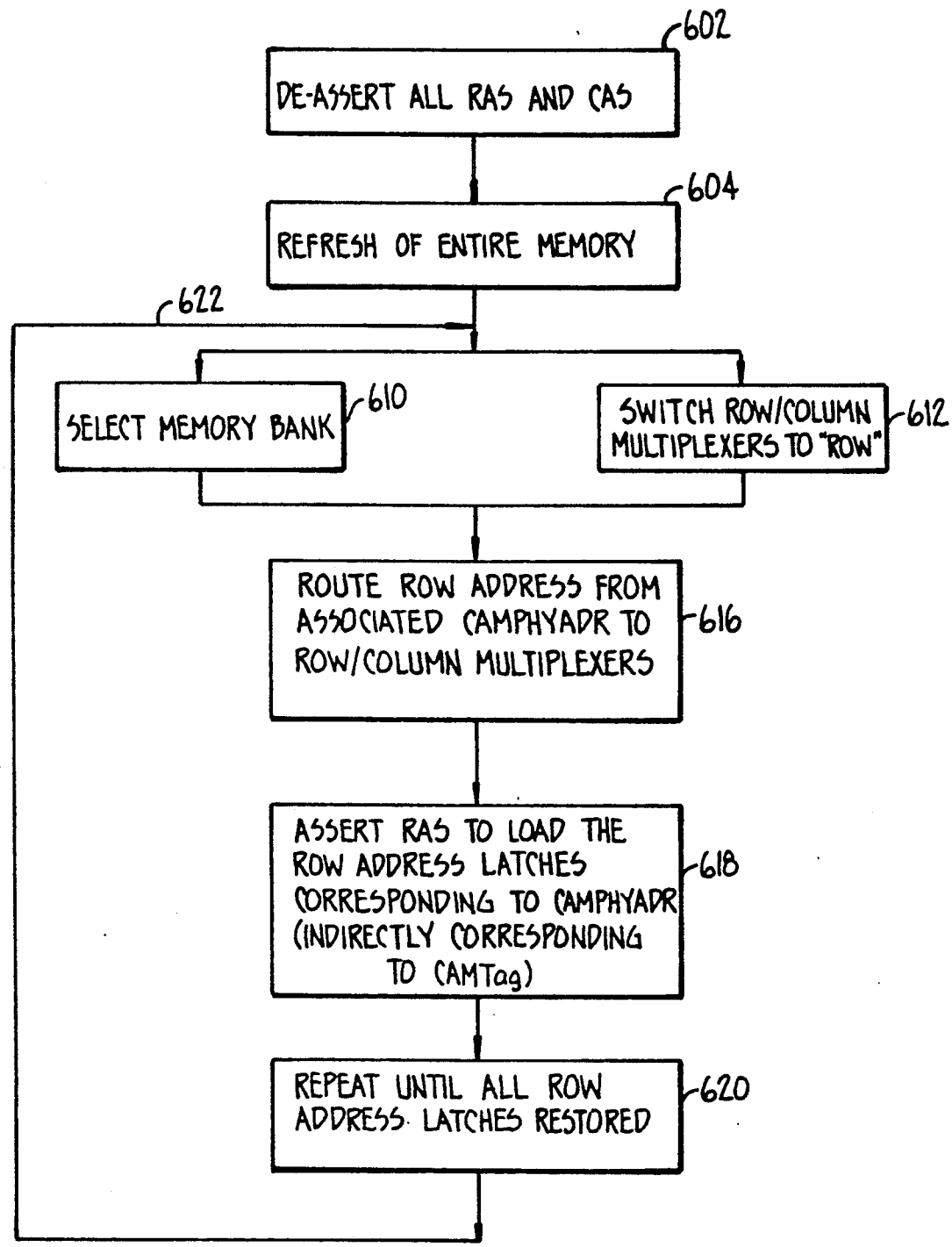
FIG._6.

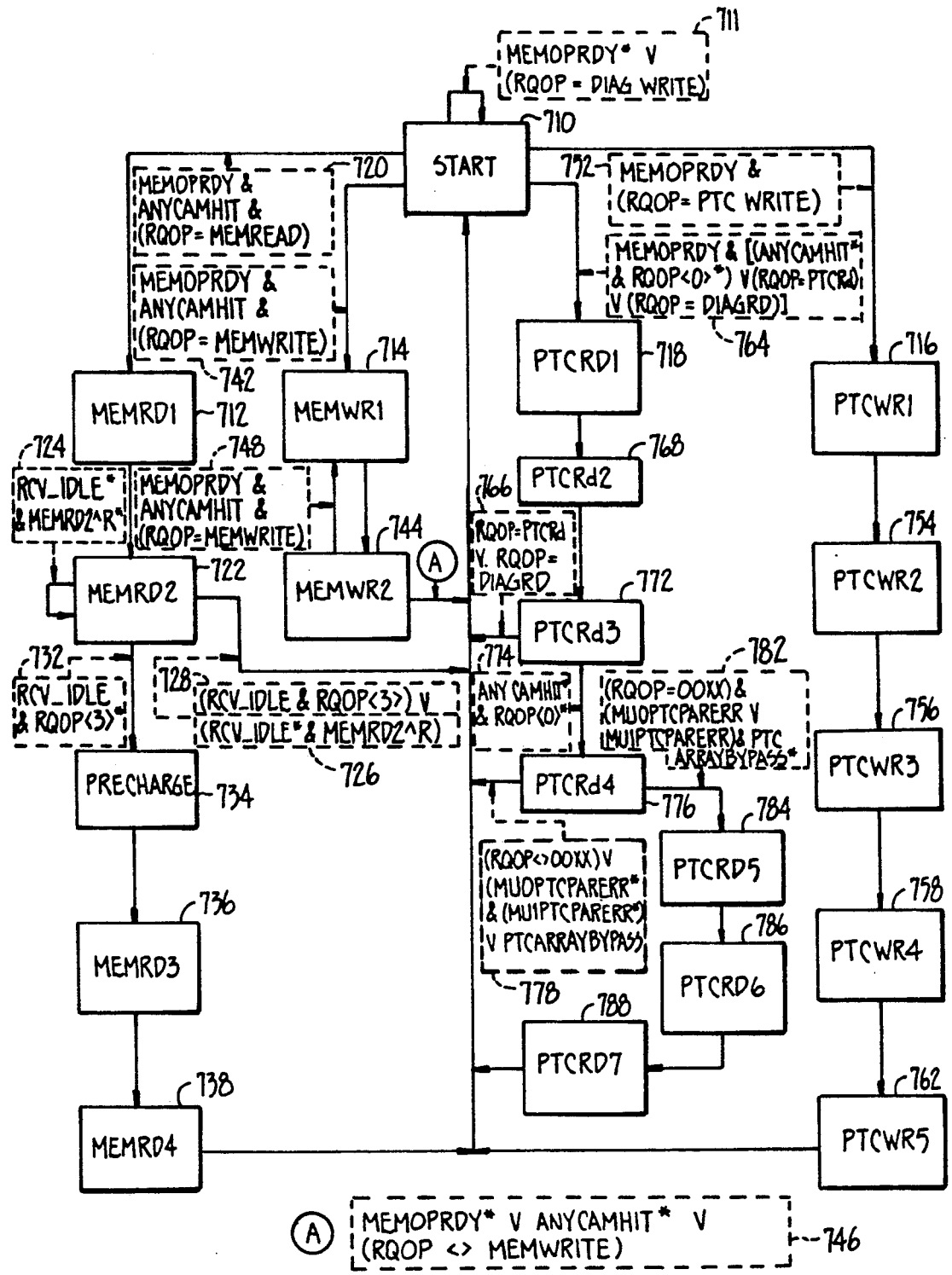
FIG._7.

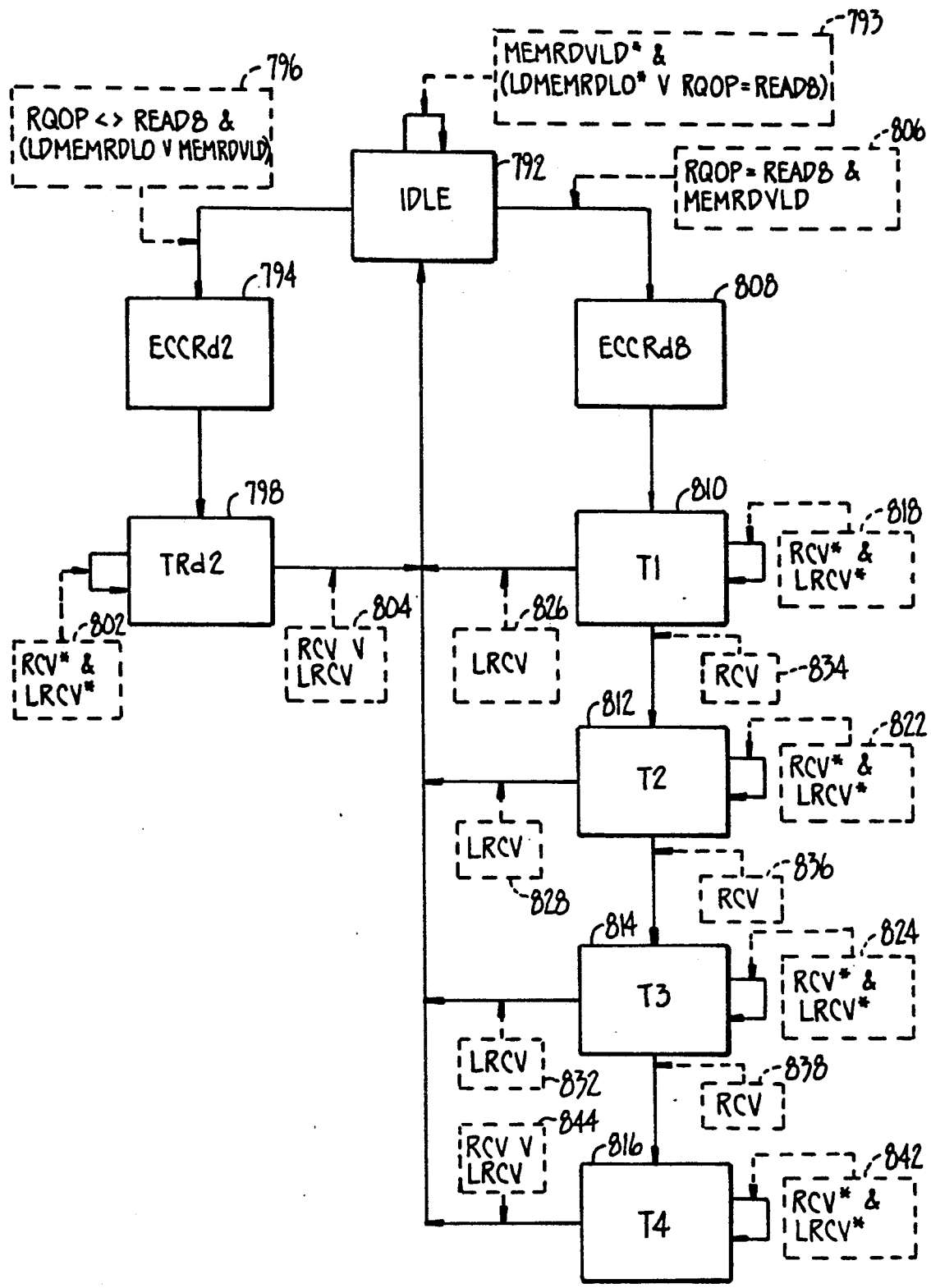
FIG._8.

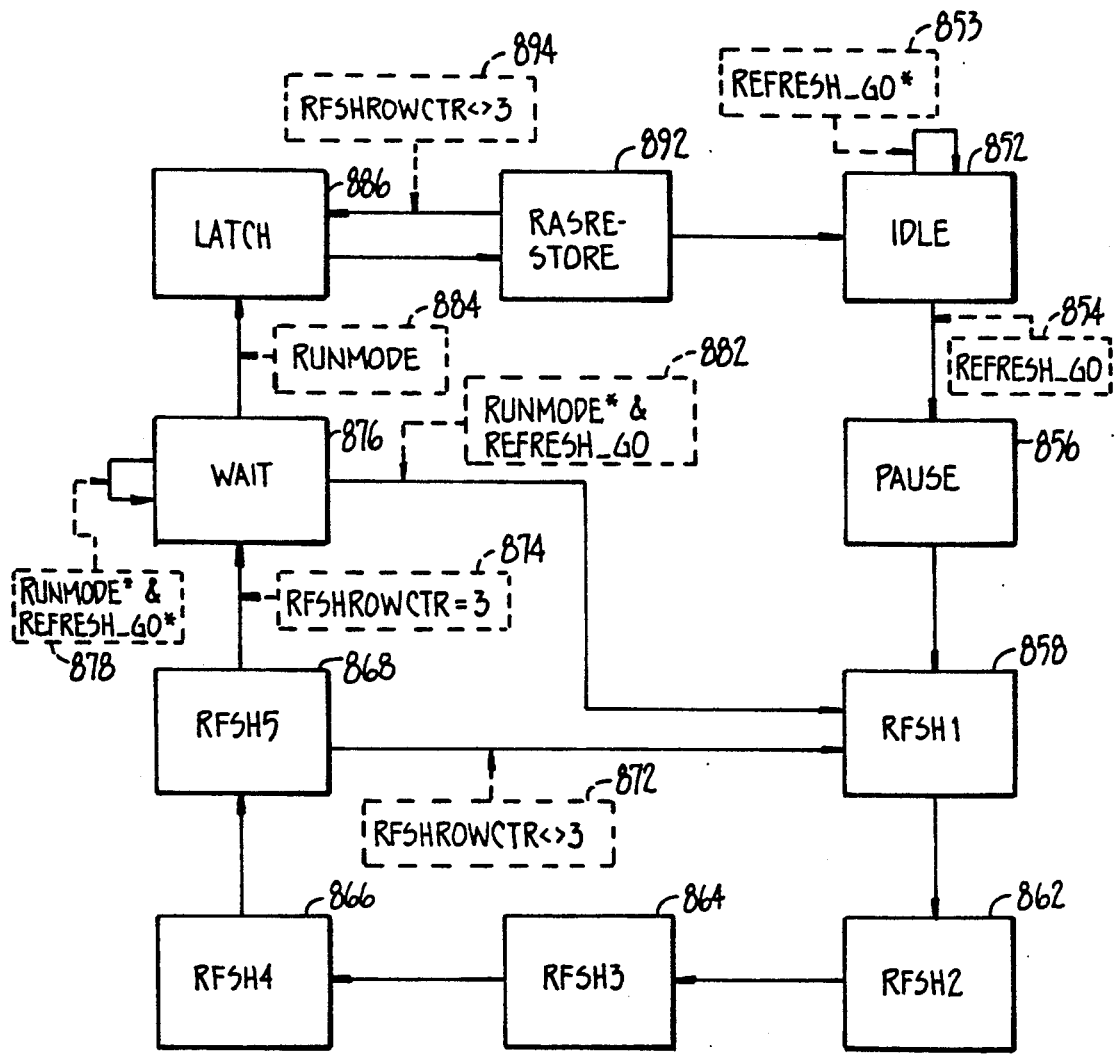
FIG._9.

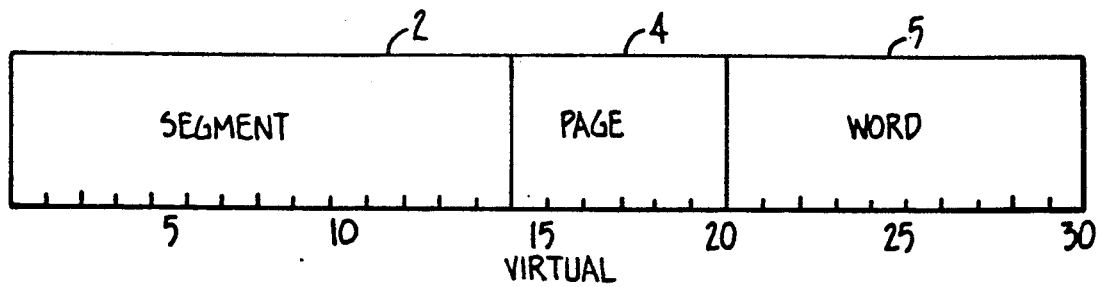
FIG._10A.
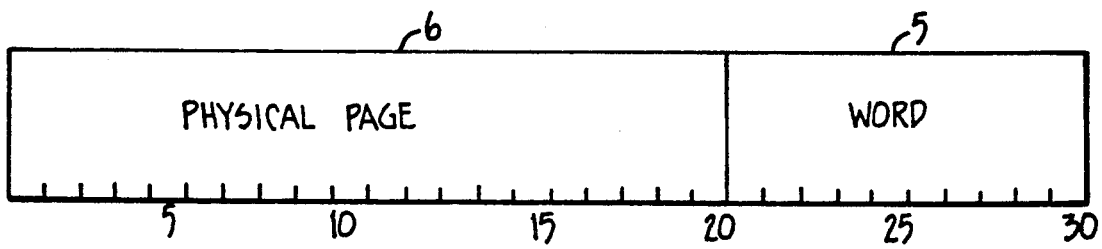
FIG._10B.
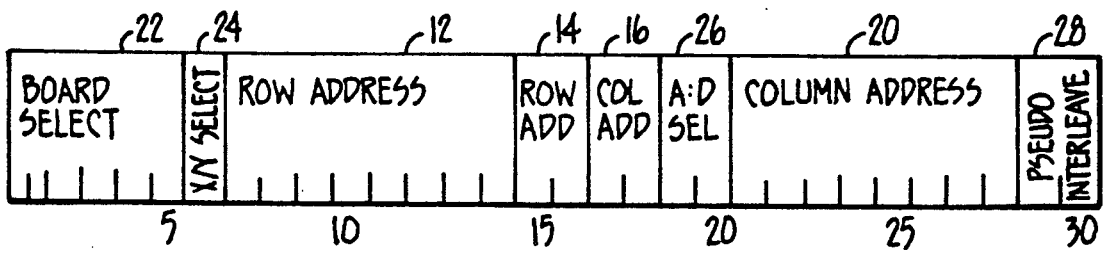
FIG._10C.
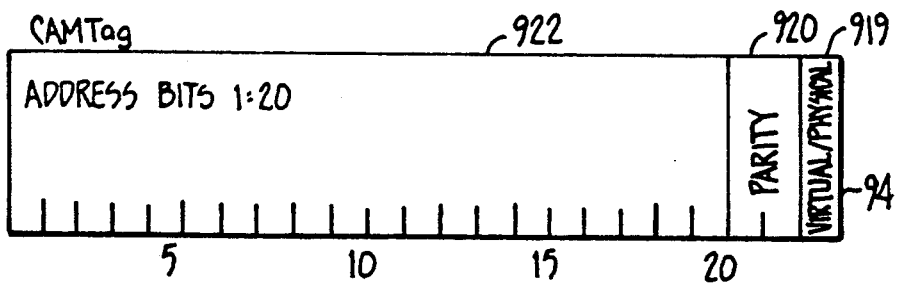
FIG._11A.
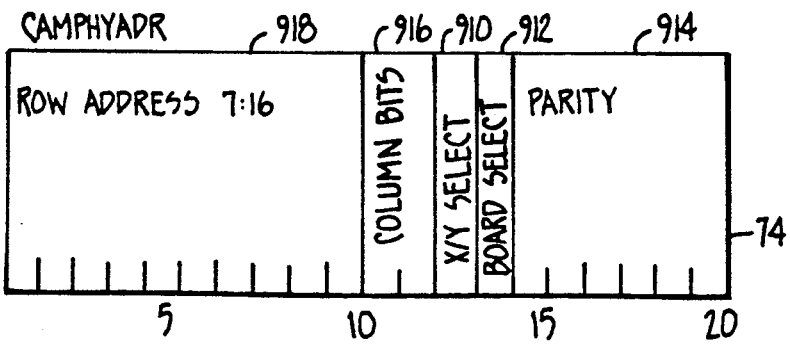
FIG._11B.

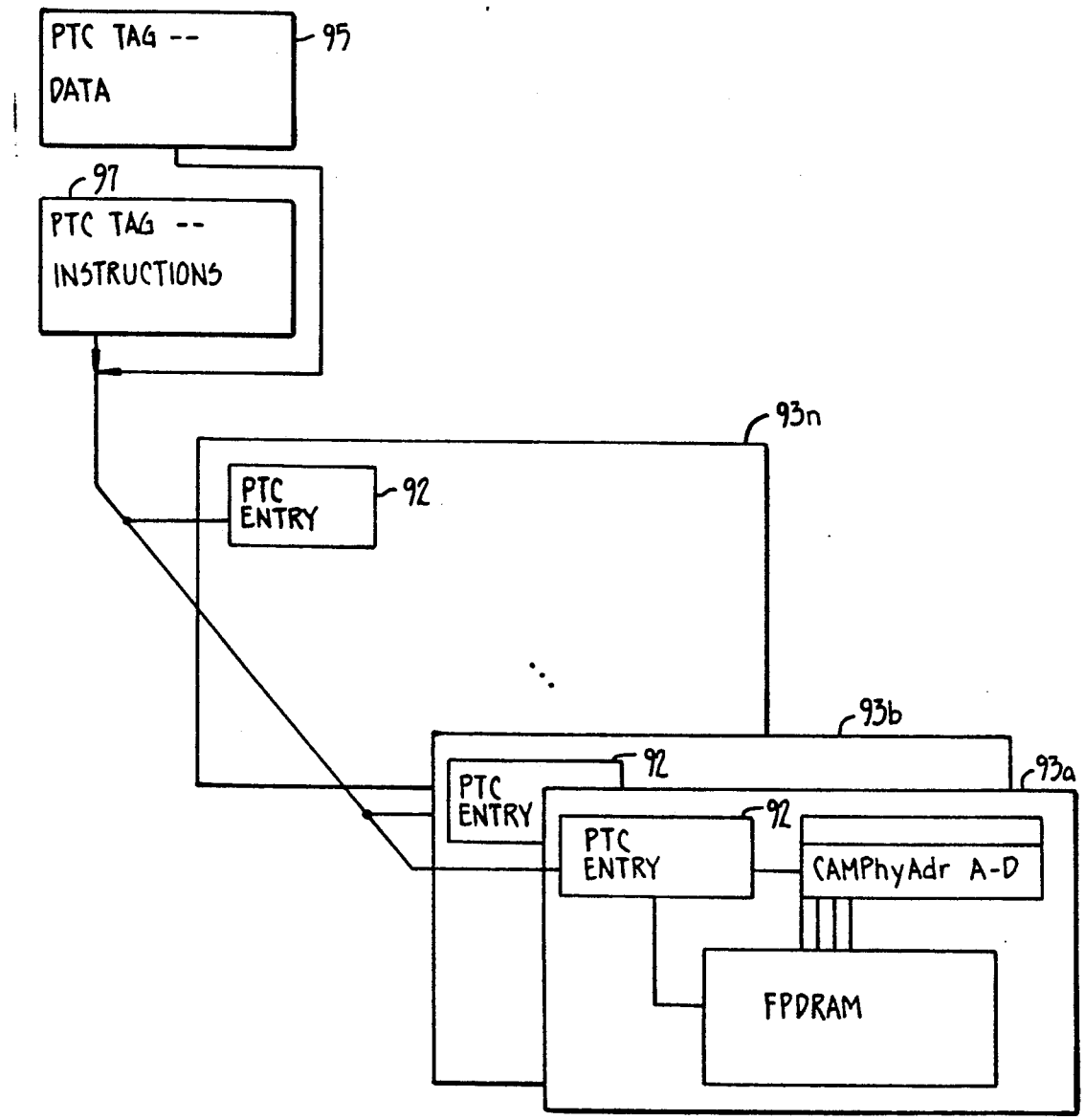
FIG._12.

APPARATUS AND METHOD FOR READING, WRITING, AND REFRESHING MEMORY WITH DIRECT VIRTUAL OR PHYSICAL ACCESS

FIELD OF THE INVENTION

This invention relates to a computer memory and a method for reading, writing, and refreshing the contents of the memory. In particular, the invention relates to a rapid method for virtual addressing of a fast page dynamic random access memory (FPDRAM).

BACKGROUND

There has been, for some time, a trend toward larger memory capacity in computers. Although larger memory capacities provide a number of well known advantages, several difficulties are also encountered with large memory systems. In general, as memory size increases, the time needed to access memory also increases, other factors remaining equal.

In many modern computing systems, the memory is provided in a hierarchical scheme. In such a scheme, a large, relatively slow memory is used in combination with a smaller, faster memory, which contains a subset of the larger memory. For example, a main memory containing relatively slow dynamic random access memory (DRAM) is used in combination with a smaller static random access memory (SRAM), often referred to as a "cache." Other hierarchies include providing a large memory, in the form of relatively slow disk storage, used in combination with the relatively faster DRAM main memory. A memory hierarchy might contain all three of these levels: long-term disk storage, main DRAM storage, and SRAM cache storage.

In many memory systems, a virtual addressing method is used. The virtual address is an address which contains enough bits to provide a unique identification for each user-accessible memory location. Physical memory is accessed through a physical address which must be mapped-to from the virtual address space.

When a request is made for the contents of memory identified by its virtual address, it must be determined whether the virtual address corresponds to a memory location currently residing in the physical memory. An address "corresponds" to another address if each corresponds to the same memory location.

One or more tables are usually provided to translate a virtual address to a corresponding physical address (if there is a correspondence). A look-up procedure for such a table is often relatively slow. The table typically contains a translation only of blocks of memory, often referred to as "pages." Fortunately, it has been found that references to the page table exhibit a locality, i.e., of all the possible virtual pages that might need to be looked up in the page table, during any one short period of time, there is a tendency for a few of these pages to be repeatedly looked up. This locality permits a certain saving of time by providing a second smaller and faster table, referred to as a "page table cache" (PTC) (or, sometimes, a "translation lookaside buffer"), which is used to contain the most recently accessed entries from the larger page table. The PTC thus contains a subset of the page table which is likely to contain the entries which will be subsequently requested. The PTC includes two arrays. One array is the PTC entry or data array, which is the virtual-to-physical address map. The other array is the PTC tag, which is used to determine whether or not the data in the PTC entry is valid.

In addition to the locality exhibited by the page table, a certain locality is also exhibited by the memory itself. According to this locality phenomenon, a given reference to a memory location is likely (i.e., with greater probability than expected from randomness) to be followed, within a relatively short period of time, by a request for a nearby memory location. The probability distributions, which define "nearby" and "relatively short period of time," can be determined empirically for a given memory system and computing task. This locality has been exploited in several ways to decrease average memory access time. One method of this exploitation is the provision of a fast page dynamic random access memory (FPDRAM).

FPDRAM can be best understood by contrasting it with ordinary memory access. In a typical DRAM, memory locations are addressed by row and column, with each row containing elements with contiguous addresses. In normal access, a row address is presented and strobed into a latch with a row address strobe (RAS), which is typically asserted. Later, a column address strobe (CAS) is presented and asserted to perform the read or write of the DRAM. Each new access must go through the entire cycle. For this reason, each access requires presenting and strobing the row address and, subsequently, strobing a column address. Because two addresses, even if relatively close together, must be sequentially strobed for any access in the memory, this type of access does not take full advantage of the memory locality.

In contrast, FPDRAM takes advantage of memory locality, i.e., situations in which access to a memory location in a particular row is relatively likely to be followed, within a short time, by a request for a memory location in the same row. In this case, it is possible to leave RAS asserted for a relatively long period, during which multiple accesses to the selected row (defined by the contents of a row address latch) may be performed. The multiple accesses are achieved by sequentially presenting column addresses while a single row address is continuously asserted. For each access to memory in a row which has been previously accessed (i.e., a row addressed by the contents of one of the row address latches), only assertion of CAS is required, i.e., it is not necessary to sequentially assert RAS and then assert CAS for each access. In this way, when a subsequent memory request is made for a location in the same row, this subsequent address is available for reading or writing by the relatively fast procedure of presenting a new column address and asserting the column address strobe (CAS). When a request is made for a memory location in another row (assuming there are no other FPDRAM row address latches usable for this request), a normal access procedure is followed, i.e., sequential loading and strobing of a row address, then a column address. In this way, to the extent that subsequent memory accesses are to locations in the same row of memory, relatively fast FPDRAM memory access is used, rather than the slower normal memory access.

To take advantage of the speed of an FPDRAM, it is necessary to determine, for any memory request, whether that request is for a memory element which resides in one of the rows corresponding to a row address in one of the row address latches. In previous systems known to the Applicant, an indication of the physical row address for the row or rows most recently accessed was stored. When a physical address request was made, a comparison was performed to determine whether the requested address was in a row recently addressed, i.e., for which the RAS was still being asserted. When a virtual address request was made, the virtual address was first translated into a physical address, and then the comparison was made with the stored physical addresses.

Even with the relatively fast access provided by FPDRAM, memory access is still a limiting factor in many systems, particularly those with large memories. Such large memory systems typically are limited by the speed of a cache-fill operation and the write bandwidth.

SUMMARY OF THE INVENTION

The present invention includes a computer memory and a method of memory access which provides for faster memory access, compared to previous systems, particularly for configurations with very large memories, such as 128 megabytes or more of memory. The present invention can be used in connection with any type of random access memory (RAM) in which access time to some subset of the RAM elements is faster than to other elements. FPDRAM's are one example of memories of this type, since access to elements in a currently selected row is faster than access to other elements.

In one embodiment of the present invention, one or more FPDRAM's form the main memory, from which requested pages are loaded into a cache. As described more fully below, pages are requested from a particular FPDRAM only after it has been determined that the address mapped by the PTC is the memory location which was requested, by looking up the address in the PTC tag.

Each row address latch of the FPDRAM is associated with two registers. One "indicator" register (termed the "CAMPhyAdr") contains the physical row address (plus additional bits, such as parity bits). The other "virtual/physical" register (termed the "CAMTag") contains either the physical row address or the virtual row address, depending on which type of address was originally requested. In this way, when a virtual address is requested (after verifying its presence in the PTC tag array), it can be compared to the virtual/physical (CAMTag) register without the necessity for first translating to obtain the physical address. The system described thus provides for rapid memory access in the case of virtual address requests, which are the most common mode of address requests. The system also provides for memory access resulting from physical address requests using the same methods as those for virtual address requests. The described methods work particularly well because memory requests in most situations have been found to exhibit a virtual/physical "locality," i.e., repeated requests from the same row tend to be of the same type, either virtual or physical. Avoiding the necessity of the virtual-to-physical translation to determine, in each case, whether the address being selected is in a row addressed by contents of a row address latch, represents a valuable savings of time. Because virtual-to-physical translation is not needed for each memory access, such translation can be done with slower, less expensive components, e.g., a slower page table cache, while still achieving rapid memory read and write.

When no match is found to the requested row, the row needed is accessed by the slower normal access mode. When a memory element in a new row is to be accessed, it is necessary to determine whether the memory request was a virtual address or a physical address. For this reason, a bit which indicates whether that address is virtual or physical is stored in the CAMTag register, along with the virtual or physical address.

An additional aspect of the invention relates to accommodating the width of an address. The width needed to uniquely address elements in a block of memory depends on the size of the block. In the preferred embodiment of the present invention, the DRAM's which are used require 10 column address bits and 10 row address bits. The virtual address in this system contains page address bits and word address bits. The word address bits are identical in the virtual and physical addresses, and thus the word address bits are not translated. The number of word address bits in a virtual address is determined by the number of words in a page. In the preferred embodiment, the page size is 2 k bytes or 1 k 16-bit words. A page of this size can be addressed using 10 bits, and thus the virtual address contains ten word address bits. This means that 10 bits in the virtual address are identical to the corresponding bits of the physical address.

The DRAMs which make up the memory are organized in a four-way interleaved fashion, i.e., four consecutive words in memory come from four different DRAMs, rather than four cells in the same DRAM. In this scheme, during a read operation, the two least significant bits of the 10-bit word address are used to select between the four interleaved words. Thus, the two least significant bits of the word address are not used in a read operation, and are discarded (for purposes of DRAM-addressing). Thus, eight word address bits (which do not require any translation) remain for use as column address bits. Since the DRAMs require 10 column address bits, two column address bits must come from the part of the physical address which does require translation. Yet, it is desirable to eliminate the need for translation on repeat accesses to the same page of 1K words. This is accomplished by storing the required additional two bits of column address in the CAMPhyAdr register, along with the 10 bits of row address (and also including parity or other error detection bits, bank-select bits, and/or board-select bits). Because only eight bits of word address contribute to the 10-bit column address, two column address bits of the address space do not change between misses.

Storage of two column address bits is similarly employed for addressing DRAM in a write operation. In the preferred embodiment, however, only one or two words are written in a single write operation. To prevent overwriting of unaddressed words, the two bits which would be discarded on a read operation are used to select which one or two words, among the four potentially addressable, will have a column address asserted, to accomplish a write at that location.

Storage of column address bits for use during CAM hit accesses is an accommodation that can be generalized for use with different types of memory. For example, three or more bits can be stored in the indicator (CAMPhyAdr) register to provide a total of 11 or more column address bits. Provision of 11 column and row bits would be useful, e.g., in connection with a 4 megabit DRAM, which typically requires 11 column address bits and 11 row address bits to access a memory element. Storage of more than two column address bits can also be useful to provide additional least significant bits for selecting among interleaved DRAMs in the case of, e.g., eight-way interleaving.

The present system achieves a decreased cache fill time and an increased effective write bandwidth, compared to previous systems not employing the disclosed invention.

The present invention includes a refresh cycle for the DRAM, which is efficient because the contents of the associated CAMTag register and CAMPhyAdr register are preserved. The RAS is deasserted during the DRAM refresh. Following the refresh, the RAS is reasserted, in a manner similar to RAS assertion following a CAM miss (i.e., non-identity of the contents of the CAMTag and corresponding portions of the requested addresses). In this way, the memory configuration following the refresh cycle is the same as it was before the refresh cycle. Thus, subsequent memory accesses can be accomplished taking advantage of the memory locality, based on row accesses which were performed before the refresh cycle.

BRIEF DESCRIPTION OF THE DRAWINGS

FIGS. 1A, 1B, 1C, 1D, 1E, 1F, 1G and 1H are simplified schematic diagrams of the memory system of the present invention;

FIGS. 2, 2A, 2B, 2C and 2D are schematic block diagrams of the memory system of the present invention showing data paths, but not control paths;

FIG. 3 is a flow diagram of a memory-read operation with a CAM hit according to the present invention;

FIG. 4 is a flow diagram of a memory-write operation, with a CAM hit according to the present invention;

FIG. 5 is a flow diagram of a memory-read operation with a CAM miss according to the present invention;

FIG. 6 is a flow diagram of a DRAM refresh cycle according to the present invention;

FIG. 7 is a state diagram of the MEMOP state machine;

FIG. 8 is a state diagram for the receive state machine;

FIG. 9 is a state diagram of the refresh state machine;

FIG. 10A is a schematic diagram of a virtual address;

FIG. 10B is a schematic diagram of a physical address;

FIG. 10C is a schematic diagram of an address used by RAM;

FIG. 11A depicts the bit types stored in the CAMTag registers;

FIG. 11B depicts the bit types stored in the CAMPhyAdr registers; and

FIG. 12 is a schematic block diagram of a PTC with distributed entry and tag arrays.

DETAILED DESCRIPTION OF THE PREFERRED EMBODIMENT

The preferred embodiment of the present invention will be described in the context of a particular computing system, although, as will be apparent to those skilled in the art, it can be used in many types of computing systems. The described computing system is a multiprocessor system containing up to 16 processors, each processor having associated with it a memory system. In the preferred embodiment, the memory system associated with each processor includes two functional units 93a (FIGS. 2A-2D). Preferably, each functional unit is formed on one or two circuit boards, each circuit board containing 32 or, preferably, 64 megabytes of memory, along with memory control devices. The present invention relates to a memory unit associated with one of such processors. Each of the memory units in the computing system operates in substantially the same way.

FIG. 10A depicts the configuration of a virtual address which includes a segment address 2 in bits 0-14, a page address 4 in bits 15-20, and a word address 5 in bits 21-30. FIG. 10B depicts the configuration of a physical address in which the physical page address 6 is contained in bits 0-20, and the word address 5 is contained in bits 21-30.

Referring now to FIG. 10C, an address as used to access the DRAM is depicted which is 30-bits wide. The address includes 10 bits of column address and 10 bits of row address. The row address is provided in bits 7-16 (12, 14). The column address is provided in bits 17 and 18 (16) and bits 21-28 (20). Bits 1-5 (22) indicate which memory board is addressed. Bit 6 (24) indicates which section of memory ("X" or "Y") is addressed. Bits 19 and 20 (26) are bank-select bits. Bits 29 and 30 (28) are used in the pseudo-interleave scheme.

Before describing in detail the operation of the preferred embodiment of the invention, the main concepts of the invention will be described by way of a simplified example with reference to FIGS. 1A-1E. A simplified memory unit, depicted in FIG. 1A-1E, includes a 64-element memory 10 having eight rows, 1a-1h, and eight columns, 2a-2h. The memory is of a fast-page type in which the row selector 3 can be left to select a given row, according to the address in a row address latch 4, during a number of successive column addresses by the column selector 5. Associated with the memory 10 are two registers, a CAMPhyAdr register 6, which holds a physical address, and a CAMTag 7, which holds an address that may be either a physical address or a virtual address. For purposes of the simplified explanation, it is assumed that an address request 8 has just arrived. The address request 8 can be an address to be used for either a read or a write to the memory. In a typical scenario, such an address request arrives after a processor has made an attempt to read or write to a cache, which was unsuccessful because the required address was not present in the cache. In case of such a "cache miss," memory must be fetched from the main memory 10 for transfer to the cache.

It is assumed in the present example that the previous access to the memory left the memory unit in the configuration shown in FIG. 1A, i.e., with the eighth row, row 111, selected. Accordingly, the row address latch 4 contains row address bits 111, and the CAMPhyAdr 6 contains the same row address (111). It is further assumed that a previous address request was for a virtual address. Accordingly, the CAMTag 7, as shown in FIG. 1A, contains a row address which is left over from the previous address request, and is thus the virtual address corresponding to the physical address 111. As seen from the page table 9, the virtual address which corresponds to the physical address 111 is 101.

As can be seen from FIG. 1A, the new address request is of the form 001110. To process the new request, first a comparison is made between the row bits in the address request 8 and the contents of the CAMTag 7. In this case, the row bits in the address request 8 are 001, while the contents of the CAMTag 7 are 101 (left over from the previous memory request). Accordingly, the comparator 11 indicates that there is a CAM miss. This means that the newly-arrived address request 8 is for a row different from the row which is presently asserted (i.e., different from row 111).

When the comparator 11 indicates a miss, the registers 6, 7 are updated, as depicted in FIG. 1B. The CAMTag 7 is loaded with the row address from the address request (i.e., 001). In a case in which the new address request is a physical address, the row bits of the physical address can be transmitted directly to the CAMPhyAdr 6. In such a case, the CAMTag and the CAMPhyAdr will contain identical indications of the requested row. As used herein, a bit string "indicates" an address or a memory location if at least a portion includes or can be translated into an address corresponding to the memory location.

In the present example, however, it is assumed that the address request 8 is a virtual address, thus requiring translation. The page table 9 is used to determine which physical address corresponds to a virtual address of 001. The page table 9 indicates that the corresponding physical address is 010. As shown in FIG. 1B, this new physical address is loaded into the CAMPhyAdr 6. As can be seen from FIG. 1B, the CAMTag 7 now contains the virtual row address for the new request, while the CAMPhyAdr 6 contains the corresponding physical row address. The physical row address from the CAMPhyAdr 6 is sent to the row address latch 4, causing the row selector 3 to select the row addressed by the physical row address, namely, row 010.

As depicted in FIG. 1C, the address request 8 is now attempted again, using the new contents of the CAMTag 7 and CAMPhyAdr 6. This time, when the row bits of the address request 8 are compared to the contents of the CAMTag 7, the comparator 11 indicates a hit. The column selector 5 selects a column in accordance with the column bits from the address request 8.

FIG. 1D depicts the next successive address request, which is, in this example, 001000. The row bits from the address request 8 match the contents of the CAMTag 7. Accordingly, the virtual row address of the new request 8 is identical to the virtual row address from the previous request, which was depicted in FIG. 1C. As a consequence, the row selector 3 is still configured to select the third row, 010. Because there has been a hit indicated by the comparator 11, the column bits from the address request 8 (i.e., 000) are used, by the column selector 5, to select the column 000.

FIGS. 1E-1G depict a simplified version of an embodiment of the invention which can be used when not all of the column bits can be directly used to control the column selector 5. In the embodiment depicted in FIGS. 1E-1G, the third column bit is stored in the CAMPhyAdr, along with the physical row bits, and is also stored in the CAMTag 7, along with the virtual or physical row bits. It can thus be seen that in the embodiment depicted in FIGS. 1E-1G, the third column bit is treated, in many respects, as if it were an additional row bit. It is stored in the CAMPhyAdr, along with the physical row bits, and a previously stored third column bit (left over from the previous memory access) is compared to the new third column bit in the incoming address request 8. By storing the third column bit and combining it with the first two column bits from the address request 8, as described below, the third column bit in the address request 8 is freed for other purposes, such as control of interleaving, described below. Furthermore, because only the first two bits from the column portion of the address request are directly used in controlling the column selector 5, the scheme which is depicted can be used when the address request contains only five bits of directly usable address information (i.e., row bits 1-3 and column bits 1-2), such as in conjunction with a page size of $2^5$ or 32 addressable memory elements.

FIG. 1E depicts the same address request and operation depicted in FIG. 1D, but using the embodiment in which the third column bit is treated similarly to a row bit. As seen in FIG. 1E, the CAMTag 7 contains the virtual or physical row bit left over from the previous address request (i.e., the address request depicted in FIG. 1C), and also contain the third column bit (0) left over from the previous address request (depicted in FIG. 1C). The bits stored in the CAMTag 7 are compared with the row bits and the third column bit in the address request 8. In this case, since both the row bits and third column bit of the incoming address 8 match the row bits and third column bit left over from the previous request, the comparator 11 indicates a hit. Since there has been a hit, the column selector 5 is used to select the column indicated by the combination of the first two column bits from the address request 8 and the third column bit stored in the CAMPhyAdr 6. The fact that the comparator 11 has indicated a hit guarantees that the third column bit, which is stored in the CAMPhyAdr 6 (left over from the previous address request), is the same as the third column bit in the incoming address request 8.

FIG. 1F depicts the next successive request, which is, in this example, 001001. In this case, the row bits from the address request 8 match the contents of the row bits in the CAMTag 7. However, the third column bit in the address request 8 (i.e., 1) differs from the third column bit entry in the CAMTag 7. Accordingly, the comparator 11 registers a miss. Because of the miss, the CAMPhyAdr 6 and CAMTag 7 registers are updated, as depicted in FIG. 1G. FIG. 1G is identical to the update depicted in FIG. 1B, except that the third column bit from the incoming address request is stored in both the CAMTag 7 and the CAMPhyAdr 6.

Following the update, the address request is attempted again, as depicted in FIG. 1H. This time, since the CAMTag has been updated, the contents of the CAMTag match the row bits and third column bit from the new address request 8. Accordingly, the comparator 11 registers a hit. Since the comparator 11 registers a hit, the column selector 5 selects a column corresponding to the first two column bits from the incoming address request 8, combined with the third column address bit stored in the CAMPhyAdr 6.

Subsequent accesses to the memory would then be conducted, using the same methods described above. When a new address request is for an address in the same row, and has the same third column bit as that of the previous address request, as depicted in FIGS. 1E and 1H, the comparator 11 indicates a hit, and only the column selector 5 needs to be used in order to access the needed memory element. When an address request is for an address in a row different from the previously-accessed row, as seen in FIG. 1A, or for a column with a third column bit different from the previously-accessed column, as seen in FIG. 1F, the CAMTag 7 and CAMPhyAdr 6 registers are updated, as depicted in FIG. 1G, and access is then retried.

There are at least two kinds or levels of "miss" which can be involved in memory access. As noted above, when a processor makes an unsuccessful attempt to access memory in a cache, a "cache miss" occurs, necessitating retrieval of a block of memory (typically, a few words) from the main memory 10. During this attempt at reading or writing the main memory 10, there can also occur a "CAM miss," i.e., a request for a row different from that previously accessed (as shown in FIG. 1A) or a column with a third column bit different from a previously accessed column (as shown in FIG. 1F).

With the simplified explanation as background, the preferred embodiment will be described, with particular reference to FIGS. 2A-2D. As depicted in FIGS. 2C and 2D, the memory 30 in one of the memory functional units is a fast page dynamic random access memory, such as Model TC511000, provided by Toshiba. The memory 30 is organized into four banks, 32, 34, 36, and 38, designated banks A, B, C, and D, respectively. Each bank 32, 34, 36 and 38 is divided into 0, 1, odd, and even blocks, to provide pseudo four-way interleaving. According to the pseudo four-way interleaving, the odd and even blocks contain contiguous words, specifically, words whose addresses differ in the least significant bit of the address. The 0 and 1 blocks contain words whose addresses differ in the next-to-least significant bit. Accordingly, in any one bank, for example 32, four contiguous words are stored in A0Ev, A0Od, A1Ev, and A1Od, respectively. The next (fifth) contiguous word will be stored in A0Ev, and so forth. Each bank is made up of 2 equally-sized sections of memory, designated X and Y. Each bank 32, 34, 36, and 38 contains $2^{22}$ words of 22 bits each. Thus, any particular word in a bank requires twenty-two address bits to be uniquely identified. These are organized as 10 row-address bits, 10 column-address bits, and two pseudo-interleave bits. In a preferred embodiment, each row address latch 42, 44, 46, 48 holds 10 address bits. Although, for clarity, the row address latches 42, 44, 46, 48 are depicted in FIGS. 2C and 2D as external to the memory 30, in fact, these are typically formed as an integral part of the memory 30.

A set 52 of write data registers 52a, 52b, 52c, 52d is provided for storing 4 22-bit words of write data. Two address registers 53a, 53b receive address bits from two column/row multiplexers 54, 56, respectively. Each bank of memory 32, 34, 36, 38 has associated with it an additional column/row multiplexer 58, 60, 62, 64. These multiplexers 58, 60, 62, 64 provide two address bits, in a manner described below, which, combined with the 8 address bits provided by the address latches 53a, 53b, make up the required 10 address bits for column addressing.

Write data for the write data registers 52 is provided from two data registers 66, 68 after processing through an error correction code generator 70, 72. The error correction code generators 70, 72 communicate, as described below, with one of four CAMPhyAdr registers 74, 76, 78, 80. The write data in the data registers 66, 68 are provided through data buses 84a, 84b, 84c, 84d, and associated multiplexers 86a, 86b.

The address bits provided to the column inputs of the first two column/row multiplexers 56, 54 arrive from incrementers 88a, 88b, which receive a column address from the memory request address register (MemRqAdr) 90. The MemRqAdr register 90 receives input from a multiplexer 91 and associated logic 93. The multiplexer 91 is connected to one or more address buses 305, 307, 309. Whether the incoming address is virtual or physical can be determined from which bus the address arrives on, possibly combined with the memory specification code. The memory specification code is a code which specifies which memory operation will be performed, e.g., read, write, diagnostic, or other operations. This determination is made by logic 93. A bit indicating whether the address is virtual or physical is sent to the MemRqAdr register 90.

Also associated with each bank of memory 32, 34, 36, 38 are two address registers viz. the CAMPhyAdr registers 74, 76, 78, 80, and the CAMTag registers 94, 96, 98, 100. A bit map applicable to each of the CAMPhyAdr registers 74, 76, 78, 80 is shown in FIG. 11B. The CAMPhyAdr 74 includes an X/Y-select bit 910, a board select bit 912, six parity bits 914, two bits of column address 916, and a physical row address 918. The physical row address 918, as explained more fully below, is obtained from one of two sources. When the address request represents a physical address, the physical row address can be directly stored in the CAMPhyAdr 74, 76, 78, 80. When the requested address represents a virtual address, the virtual row address is first translated, using the PTC entry 92.

In the preferred embodiment, the page table cache (PTC) is accessed using hashing logic 95. As noted above, the PTC includes an entry portion 92 and a tag portion 95, 97 (FIG. 12). In the preferred embodiment, there are two separate PTC tag arrays. One tag array is used for the data cache 95; the other tag array is used for the instruction cache 97. Also in the preferred embodiment, as depicted in FIG. 12, the PTC is distributed in the sense that, while there is one PTC entry array 92 for each memory functional unit 93a, 93b, 93n, the PTC tags 95, 97 are not located on the memory board or functional unit 93a, 93b, 93n. This avoids the necessity of including a PTC tag 95, 97 on each functional unit. There are at least three possible configurations for the PTC entry and tag. Both the entry and tag could be positioned at the memory. However, such a configuration would provide for slower access in the normal (CAM hit) case. Second, the entry and tag could both be positioned at the source of the requests. However, such a configuration would require more memory than other options, and would necessitate translation on each main memory access. In the preferred embodiment, the PTC tags 95, 97 are at the source of the requests, while there is one PTC entry array 92 for each memory functional unit (FIG. 12). This configuration provides for rapid access in the normal (CAM hit) case, provides for efficient use of memory, and provides for avoiding translation on each memory access.

Also associated with each memory bank 32, 34, 36, 38 are the CAMTag registers 94, 96, 98, 100. As depicted in FIG. 11A, a CAMTag register 94 includes a virtual/physical bit 919, two parity bits 920, and virtual or physical address bits 1-20 (922). Associated with each CAMTag register 94, 96, 98, 100 is a comparator 102, 104, 106, 108, respectively.

Logic for controlling operation of the memory unit is provided in a receive state machine 112, a MEMOP state machine 114, and a refresh state machine 115. The receive state machine 112 controls the distribution of data back to the requestors. The refresh state machine 115 controls the column address strobe (CAS) and row address strobe (RAS), as well as the memory refresh. The MemOp state machine 114 arbitrates, initiates memory cycles, and cooperates with the refresh state machine on refreshes and memory accesses, as described in detail below.

The output portion of the memory unit includes output registers, error correction devices, and bus gates. The output register 116 holds eight memory words corresponding to two cycles of the pseudo four-way interleave read. The memory data which has been read is sent, via multiplexers 118a, 118b to error correction circuitry 120a, 120b, and thence to output registers 122a, 122b. The output registers 122a, 122b are connected to data buses 124a, 124b via control gates 126a, 126b.

Description of the operation of the present invention will include a description with reference to four memory system operations: a read operation when there is a CAM hit; a write operation when there is a CAM hit; a read or write operation when there is a CAM miss; and a refresh operation.

Before an address request is processed by a memory functional unit, it is first determined that the address is valid in the sense that the address which will be retrieved from the memory functional unit will be the desired address. Verifying the validity involves verifying presence in the PTC tag.

The PTC tag 95, 97 (FIG. 12) is consulted to determine whether the page which has been requested exists in the PTC. If the page is not present in the PTC, termed a "PTC miss," the operating system microcode conducts a remap of the page table cache 92, 95, 97, and the address access is restarted. In case of a PTC miss, it is necessary to update the PTC tag 95, 97 and PTC entry 92 from the larger page table (not shown). The PTC tag 95,97 is updated directly from the page table. To update the PTC entry 92, the physical address arrives through the data bus 84, and the virtual address arrives through one of the MemAdr buses, 305, 307, 309 (FIG. 2A). The physical address is transmitted over the RqData bus 82 through a gate 162 to the PhyAd bus 142, and thence to the PTC entry table 92. The virtual address is transmitted to the address bus 130, through a gate 144 to the PhyAd bus 142 and thence to the PTC entry table 92. The new entry is written twice, once in the lower half 92a and once in the upper half 92b of the PTC entry table. Next, all CAMTags 94, 96, 98, 100 are invalidated, and the memory request which caused the PTC update is retried.

As noted above, in an FPDRAM, a memory access is relatively fast if the requested memory element resides in a row for which RAS is already being held asserted (as the result of a previous request having been directed to an element in that row). In the preferred embodiment, there are four row address latches, 42, 44, 46, 48, so that there is a CAM hit when any of the four latches 42, 44, 46, 48 contains a row address for the row containing the memory element which is requested. When none of the four row latches 42, 44, 46, 48 contains a row address for the requested memory element, there is a CAM latch miss, and one of the row address latches 42, 44, 46, 48 must be loaded with a new row address, as described more fully below.

The memory operation, in which there is a CAM hit for a requested data element, will be described with respect to the apparatus which is in a normal operative state, i.e., which has been operating sufficiently long that each of the four row address latches 42, 44, 46, 48 contains a row address as a result of a previous request for an element in such row. The manner in which a newly initiated or powered-up memory board reaches this state will be understood readily by those skilled in the art after the description of a read or write with a CAM miss, described more fully below.

Referring now to FIGS. 2A-2D and 3, when the memory system depicted in FIGS. 2A-2D is in the described normal operative state, a memory read operation begins with a memory read request arriving 310 over one of the address buses 305, 307, 309. When more than one memory request is present, arbitration logic in the receive state machine 112 arbitrates among these requests 312 and, according to a predetermined priority system (and after the memory system is in a condition to receive the next memory request), sets the multiplexer 91 to convey one of the requested memory addresses to the MemRqAdr register 90. Also during this time, data which is on the data buses 84A, 84B, 84C, 84D, is routed through multiplexers 86a, 86b to data registers MemRqDataOd 68 and MemRqDataEv 66. Because the request being considered presently is a read request, the data on these data buses is spurious, i.e., it represents whatever data, if any, happens to be on the data buses at that time. Thus, this data is unrelated to the read request, and will be unused. Also during this time, a logic circuit 93 is used to determine 314 whether the memory request, which has been admitted through the multiplexer 91, is a physical address or a virtual address. This determination can be made based on which of the address buses the address request originated from and, in some cases, portions of the memory specification code which is associated with that memory request. The logic 93, after calculating whether the address is virtual or physical, sets a bit in the MemRqAdr register 90 to indicate whether the address is virtual or physical 314.

In the next stage of the operation, five procedures are initiated at approximately the same time: the loading of a column address 315, a comparison 316, maintaining of bits 317, initiating translation 318, and board and XY select 320.

The bits from the MemRqAdr register 90, which constitute eight of the ten column address bits, reside in bit positions 21-28. During loading of the column address 315, these bits are routed through an address bus 130 to an incrementer bus 132 to arrive at incrementers 88a and 88b. The three least significant word address bits (in a cache fill) will always be zero. This is because a cache line is eight words ($2^3$) and the first word in the line has an address for which the last three bits are 000. In the first half of the read operation, the address which arrives through incrementer 88a is unincremented (i.e., incremented by zero), and bits 21-28 (20, FIG. 10C) passed through a column/row multiplexer 54 which, in the current state, is set for "column," and passed through the address latch 53a to an address register bus 134a. The column address which passes through the second incrementer 88b is incremented by one, and bits 21-28 (20, FIG. 10c) are passed through a second column/row multiplexer 56, also set to "column," through the address latch 53b, to a second address register bus 134b. The addresses arriving through the address latches 53a, 53b thus contain only some of the column address bits, namely, bits 21-28. Furthermore, it is important to note that the address latches 53a, 53b will change contents for each memory access request.

In order to complete the ten column address bits required for a full column address, two additional column address bits are supplied to each of the memory banks 32, 34, 36, 38, through column/row multiplexers 58, 60, 62, 64, which are set to "column." However, unlike the column address bits which pass through the address registers 53a, 53b, these two column address bits, corresponding to bits 17 and 18 of the physical address, are not supplied directly from the MemRqAdr register. Rather, these bits are provided from the four physical address registers, or CAMPhyAdr A, B, C, and D, 74, 76, 78, 80. It is possible to supply two column address bits from these registers, because these two column address bits are unchanged or constant as long as there has not been a CAM miss indication. As described more fully below, these two column bits change only when there is a CAM miss. In this way, the two column address bits 17 and 18 supplied by the CAMPhyAdr registers 74, 76, 78, 80 act in a manner similar to row address bits. Accordingly, the process depicted in FIG. 3 includes maintaining these two bits 317 from each CAMPhyAdr register to each corresponding row/column multiplexer 58, 60, 62, 64.

Although each of the four row/column multiplexers 58, 60, 62, 64 provides two bits (for a total of eight bits), only one of these multiplexers (i.e., only two bits) will be used during any one memory access. This is because a column address strobe will be asserted over only one of the four banks 32, 34, 36, 38 of memory.

During the same time, four comparisons 316 take place. The comparisons which are made are comparisons between the bits from the MEMRqAdr register 90 and the contents of each of the CAMTag registers 94, 96, 98, 100. The bits to be compared with the CAMTag registers include the row address, board select bits, X/Y select bit, and bank select bits, along with the virtual/physical bit which has been set by the virtual/physical logic 93. The 20 bits which reside in each of the CAMTag registers 94, 96, 98, 100 also contain virtual or physical row address bits (from a previous memory access), board select bits, bank select bits, an X/Y select bit, and a virtual/physical bit. The comparisons are done by four comparators 102, 104, 106, 108 which receive inputs from the CAMTag registers 94, 96, 98, 100 and from a virtual/physical bus 136, which is in communication with the address bus 130.

Each comparator 102, 104, 106, 108, which finds an identity between its two inputs, generates a hit signal and transfers this hit signal to the MEMOP state machine 114. In the preferred embodiment, there is a direct mapping between the CAMTag registers 94, 96, 98, 100 and the four memory banks 32, 34, 36, 38. Under such direct mapping, CAMTagA 94 will only contain an address corresponding to memory addresses in the first bank 32, CAMTagB 96 will only contain an address corresponding to the memory contents of the second bank 34, and so on. Because of the direct mapping aspect, in normal operation, at most one of the four comparators 102, 104, 106, 108 will indicate a hit.

At this point, the MEMOP machine 114 contains an indication of whether or not there has been a hit, and which of the four banks A, B, C, D, (32, 34, 36, 38) contains the hit. The selection of the X or Y portion of memory 320 is controlled by bit 6, which is output by the CAMPhyAdr registers 74, 76, 78, 80 for output to the column address strobe logic 152, 154, 156, 158.

Also at this time, virtual-to-physical translation is initiated 318. As noted above, the address which is in MemRqAdr register 90 may be either physical or virtual. The results of a virtual-to-physical translation will only be used when (1) the content of MemRqAdr 90 is a virtual address, and (2) there has been no hit with any of the four CAMTag registers 94, 96, 98, 100. However, because the virtual-to-physical translation takes a number of machine cycles to accomplish, the translation is initiated at this time so that, should the translation prove necessary (as depicted in FIG. 5), the translation process will have begun before the results are determined to be necessary. In those cases when translation is not necessary, the results of the translation will be ignored.

The subsequent portions of the operation depend on whether there has been a CAM hit 322, which, as noted above, is a determination which has, at this point, been made by the MEMOP state machine 114. In the scenario depicted in FIG. 3, one of the CAMTags 94, 96, 98, 100 indicates a hit with respect to bits 1-20 from MemRqAdr 90. For ease of the following discussion, it will be assumed that the hit is indicated by the second comparator 104. As will be apparent to those skilled in the art, the following discussion will be applicable, to a hit indication by any other comparator 102, 106, 108.

Because there has been a hit in the second comparator 104, the second row address latch 44 contains the row which includes the memory element being requested. This fact is indicated, since the corresponding (second) CAMTag 96 contains the row address for the row stored in the second row address latch 44. The row address in the second CAMTag 96 may be either a physical row address or a virtual row address. However, regardless of whether the row address in the second CAMTag 96 is virtual or physical, when there is identity between a CAMTag 96 and bits 1-20 of the MemRqAdr 90, the address which is being requested must reside in the row addressed by the contents of the corresponding row address latch 44. In this way, it is possible to obtain a CAM hit without having to wait for a virtual-to-physical translation. The efficacy of this scheme is promoted by the above-noted locality of "virtualness," i.e. the fact that once a virtual or physical address request is made, subsequent requests for memory elements in the same row are highly likely to be of the same type (i.e., virtual or physical).

As noted above, portions of a column address have passed through the first two column/row multiplexers 54, 56, and other portions pass through the remaining column/row multiplexers 58, 60, 62, 64. After these addresses have settled, in order to select the requested column from the row addressed by the second row address latch 44, a column address strobe must be asserted to the second bank of memory 34. As noted above, the MEMOP state machine 114 contains an indication that the second bank, B, 34 contains the memory element corresponding to the hit indication. Therefore, the MEMOP state machine asserts a column address strobe (CAS) 324 to the second bank of memory 34.

In the preferred embodiment depicted in FIGS. 2A-2D, transfer of read data during a read is achieved in two stages: one-half of the requested data is transferred to the output register 116, the addresses are appropriately incremented, and the second half is transferred. Referring again to FIG. 3, following the assertion of the column address strobe 324, one-half of the data is transferred 326 to the MemRd register 116. Next, the MEMOP state machine 114 simultaneously deasserts 328 the column address strobe and engages 330 the incrementers 88A, 88B. Engaging the first incrementer 88A causes that incrementer to increment the address which passes through that incrementer by 4. This incrementation corresponds to setting a single bit of the address from a 0 to a 1. Similarly, the second incrementer 88B also increments the address passing through that incrementer by 4. The incremented addresses are passed through column/row multiplexers 54, 56, (both set to "column") to the address latches 53a, 53b.

At this point, simultaneously, the MEMOP state machine 114 initiates the error correction logic 120A, 120B for correction of error in the first half of the read data 334, and reasserts CAS 322. Because of the reassertion of CAS 332, following incrementation 330 (and following enabling the proper latches in the data register 116), transfer of the second half of read data 336 is accomplished to the MemRd registers 116. Next, simultaneously, the CAS is deasserted 340, and error correction for the second half of read data is initiated 342. Finally, read data from the error correction circuitry is delivered 344 to data registers 122A, 122B, and thence through gates 126A, 126B, controlled by board output enable logic 150, to data output buses 124A, 124B.

Referring now to FIG. 4, a second operation is depicted which includes a memory write when there is a CAM hit. The initial stages of this operation are similar to those described above in connection with a read operation. One or more memory requests arrive 410, and the requests are arbitrated 412. The requested address is sent to MemRqAdr, and the write data arrives over the data buses and is sent to MemRqData registers 66, 68. In this case, the write data is real data (as opposed to the spurious data of the read request). Also at this time, it is determined whether the address is virtual or physical 414, and the virtual/physical bit in MemRqAdr is set. Next, simultaneously, the column address bits are loaded 415, and maintained 417, a comparison is done with the CAMTags 416, and virtual-to-physical translation is initiated 418. At the same time as these steps, the write data is sent from the data register 66, 68 to error correction code check bit generators 70, 72, and thence to the latches in the write data register 52.

In the process depicted in FIG. 4, the MEMOP state machine 114 determines that there has been a CAM hit 422 and, accordingly, determines on which of the four memory banks 32, 34, 36, 38 to assert the CAS and write enable (WE) 424. The write enable is asserted first and, following a delay of one cycle, the column address strobe is asserted. Assertion of the column address strobe and write enable causes transfer of the write data 446 from the write data register 52 to one of the memory banks 32, 34, 36, 38. Following the transfer, the column address strobe is deasserted 448.

It will be noted that, with respect to the operations depicted in FIGS. 3 and 4, the reading and writing of data is accomplished with assertion and deassertion of the column address strobe. During both of these operations, the row address strobe is continually asserted. The operations depicted in FIGS. 3 and 4, using assertion and deassertion of only the column address strobe, are relatively fast. According to the present invention, full advantage is taken of this relatively fast operation, because it is done without the necessity of obtaining a virtual-to-physical translation of the address. Although such translation is initiated in all cases, once it is determined that there is a CAM hit and that, consequently, the translation will not be needed, the operation proceeds without waiting for such translation to be completed. This relatively fast transfer of data enables relatively fast cache fills and high write bandwidths.

Referring now to FIG. 5, a process, which can be either a read process or a write process, but in which there is a CAM miss with respect to all four CAMTags 94, 96, 98, 100, is depicted.

The first portion of the process is similar to the first portion of the process of FIGS. 3 and 4. One or more memory requests arrive 510, and are arbitrated 512 with the address being sent to MemRqAdr and the data from the data buses being sent to MemRqData 66, 68. It is determined whether the address is virtual or physical, and the virtual/physical bit is set in MemRqAdr 514. Simultaneously, column address bits are loaded 515, and maintained 517, a comparison is done with each CAMTag 516, and virtual-to-physical translation is initiated 518. In this case, the MEMOP state machine 114 determines that there has been no hit on any of the CAMTags 94, 96, 98, 100, constituting a CAM miss 522.

Subsequent processes depend on whether the address which resides in MemRqAdr 90 is a virtual address or a physical address. This determination is made 550 by the MEMOP state machine, using the virtual/physical bit, which has been calculated by the virtual/physical logic 93. If it is determined that the address in MemRqAdr 90 is a physical address, the row address bits (bits 7–16), along with the X/Y select bit, bit 6, are sent directly to the PhyAd bus 142 through gate 144.

If the address in MemRqAdr is determined to be virtual, it is necessary that the virtual-to-physical address translation be used. As noted above, the virtual-to-physical address translation was previously initiated 518. This translation is done using a hash scheme, employing hash logic 95, in a manner well known in the art. The hashed address is used as a look-up index in the lower half 92a of the PTC entry table 92. The lower half 92a and upper half 92b of the entry tables are duplicates of each other. Normally, the lower half 92a is used. However, if an error is detected 553 when trying to access the lower half of the page table cache 92, the spare select switch 160 is activated in order to access the upper half or "spare" PTC entry table 92b.

After translation is accomplished, the results of the translation are sent 560 to the PhyAd bus 142. Once the row address, either directly from the MemRqAdr register 90 or as a result of the translation 560, is available on the PhyAd bus 142, the process can continue. In the present embodiment, even when the MemRqAdr address is physical, a delay 562 is initiated to take up the amount of time which would be required if a translation of a virtual address were done.

Next, bits 19 and 20 on the PhyAd bus 142 are observed by the MEMOP state machine 114 in order to determine which of the banks 32, 34, 36, 38 must be updated 564. Note that, in this embodiment, two bits are needed to specify the bank, since there are four banks. In other embodiments, more or fewer banks could be used in connection with more or fewer bank determination bits. For ease of the following discussion, it will be assumed that the memory request is for a memory element residing in the second bank 34 of memory. As will be apparent to those skilled in the art, the following discussion will be applicable, to a memory request for an element residing in any other bank 32, 36, 38.

In the next step, three operations are conducted simultaneously: a deassertion of RAS 566; a loading of the CAMTag 568; and a loading of the CAMPhyAdr 570. The row address strobe is deasserted 566 only with respect to the second row address latch 44, corresponding to the bank 34, which needs updating, as determined previously 564. The second CAMTag 96, corresponding to the second bank 34 which is being updated, is loaded 568 with bits 1–20 directly from the MemRqAdr register 90. It may be either a virtual address or a physical address. By loading either a virtual or a physical address into the second CAMTag 96, subsequent requests of the same type (i.e., virtual or physical) which are made for memory elements in that row whose address is being loaded into the second row address latch 44 will generate a hit with respect to the second CAMTag 96.

At the same time, the physical address which resides on PhyAd bus 142 (along with other bits which are stored in the CAMPhyAdr register, such as board select bits, bank select bits, and parity bits, as described above) is loaded, over the PhyAd bus 142, into the second CAMPhyAdr register 76, which corresponds to the second bank 34. In this way, both the second CAMPhyAdr register 76 and the second CAMTag 96 are updated to reflect the physical row address and the virtual or physical row address, respectively, of the row which is being loaded into the second row address latch 44.

The row/column multiplexers 54, 56, 58, 60, 62, and 64 are all switched to "row" 572. The row address constituting bits 7-14 are sent over a first row address bus 166 from the second CAMPhyAdr register 76, through the first two column/row multiplexers 54, 56 to the address latches of the write data register 52. At the same time, bits 15 and 16 of the row address are sent 576 from the second CAMPhyAdr register 76, over the row address bus 166 to the corresponding (second) column/row multiplexer 60. At this point, the row address strobe is reasserted 578. The column/row multiplexers 54, 56, 58, 60, 62, 64 are switched to "column" 580, and the memory access which caused the CAM miss is retried 582.

As noted above, in the preferred embodiment, the computing environment contains a plurality of functional units or memory units 93a (each typically residing on one or two boards), such as that depicted in FIGS. 2a-2d. Accordingly, a system is provided for determining whether the requested memory resides on a particular memory unit 93a and for assuring that memory which is not on a given memory unit 93a is not read from or written to that memory unit 93a. To achieve this goal, each CAMPhyAdr 74, 76, 78, 80 includes a board-select bit. The value of each board-select bit 912 is computed during the procedures following each CAM miss. Each memory unit contains a device 138 for storing an indication of the "board base" and an indication of the size of a particular memory unit (e.g., 32 or 64 megabytes). The board base and size are loaded in each memory unit 93a at power-up. The board base indicates the starting address of the memory unit. From the starting address of the memory unit and the size of the memory unit, the range of addresses residing on that memory unit can be determined. During the procedures following a CAM miss, the requested address is compared, using comparator 146, to the range of addresses on the memory unit, and the board select indicator 148 is produced, indicating whether the requested address is on that memory unit. The board-select indicator 148 is stored in the corresponding CAMPhyAdr 74, 76, 78, 80 as the board select bit 912. During a write operation, if the board-select bit 912 for that CAMPhyAdr 74, 76, 78, 80, for which there has been a hit, indicates that the address does not reside on that memory unit, the column address strobe is not asserted, and thus writing to that memory unit is prevented. During a read operation, if the board-select bit 912 in the CAMPhyAdr 74, 76, 78, 80, for which there has been a hit, indicates that the requested memory does not reside on that memory unit, the MEMOP state machine 114, using board output enable logic 150, prevents the data from being transmitted through the memory unit output buses 124.

Referring now to FIG. 6, there is illustrated a procedure used during the refresh of a dynamic memory, such as that depicted in FIGS. 2a-2d. In the preferred embodiment, refresh is done in a "burst" manner. In this scheme, a block of memory is refreshed during a given refresh cycle. The size of the block which is refreshed and the delay between refresh cycles are selected in order to provide, on average, the needed frequency of refresh for any individual memory element. The refresh is preferably timed to be coordinated with RAS assertion time specifications (i.e., that period of time which the FPDRAM manufacturer specifies as being the maximum time period that the RAS can safely be continuously asserted). Preferably, a refresh cycle or burst is delayed, when possible, until about such time as the maximum time specified by the memory manufacturer for RAS assertion has passed. In this way, memory refreshes can be used not only to comply with the needed frequency of dynamic memory refresh, but also to comply with maximum RAS assertion specifications.

The refresh is done for the entire memory. The memory refresh is followed by RAS restoration, done in a bank-wise fashion, as described below. In the following, the refresh will be described in a preferred scheme in which the order of RAS restore is bank A, bank B, bank D, and bank C (i.e., according to a Gray code). Other orders of refresh are possible, as will be apparent to those skilled in the art.

Referring to FIG. 6, during an initial portion of the refresh operation, all CAS and RAS signals are deasserted. Next, four rows of all DRAMs 30 are refreshed. Preferably, several refresh cycles are used, e.g., four or eight refresh cycles.

During the final portion of the refresh operation, RAS restoration is done bankwise. Memory bank A is selected 610 for RAS deassertion, and, simultaneously, the row/column multiplexers 54, 56, 58, 60, 62, 64 are switched to "row" 612. The row address residing in the first CAMPhyAdr register 74 is routed over the row address bus 166 in a manner similar to that described above in connection with a CAM miss 574,576. Next, RAS is reasserted 618 to the first memory bank 32, causing the same row address which formerly resided in the first row address latch 42 to be loaded back into that row address latch 618, substantially as described above in connection with a CAM miss 578.

It can thus be seen that, following the refresh of the first bank of memory 32, the row address latch 42 will be in substantially the same configuration as before the refresh, and thus will maintain its correspondence to the first CAMPhyAdr register 74 and the first CAMTag register 94. Following the assertion of RAS, the bank selection is incremented to bank B 620, and RAS restoration is completed 622 with respect to this bank. The refresh, with respect to banks B, D, and C, will also leave the row address latches 44, 48, 46, CAMPhyAdr registers 76, 80, 78, and CAMTag registers 96, 100, 98 in substantially the same condition as before the refresh. In this way, following the complete refresh cycle, the access of memory can continue in the same manner as before the refresh, taking full advantage of the locality structure and information inherent in the contents of the CAMPhyAdr registers 74, 76, 78, 80, CAMTag registers 94, 96, 98, 100, and row address latches 42, 44, 46, 48, which had been built-up before the refresh cycle.

In some computer operations, mainly diagnostic and error recovery operations, it is desired to read the contents of the PTC entry table. When this is desired, a data pathway is provided to transport data from the PTC entry table to the data output buses 124. This data path is from the PTC entry table 92 along the PhyAdr bus 142, through a gate 170 to a portion of the RqData bus 82, and thence to a PTC entry bus 172 for delivery through multiplexers 174, 176, to output registers 116, and eventually to output data registers 122 and data buses 124.

Operation of the memory unit, as described above, is controlled largely by three state machines: MEMOP state machine 114, the receive state machine 112, and the refresh state machine 115. Each state machine operates somewhat independently of the others, although, where noted below, states for some state machines will be coordinated with particular states for other state machines, and certain state transitions in one state machine are dependent on the status of another state machine.

In the following, operation of the state machines will be described with respect to state diagrams. In the state diagrams, the solid-boxed elements represent states of the state machine, and the solid lines with arrows indicate transitions from the present state to the next state. Dashed boxes with dashed arrows, ending on the solid arrows, indicate conditions which must be satisfied for the indicated transition to take place. An asterisk (*) with a condition indicates a logical "not." RqOp indicates the "requested operation." A "v" indicates a logical "or." An ampersand (&) indicates a logical "and." A "< >" symbol indicates "not equal to."

The MEMOP state machine 114 handles all non-refresh accesses to the memory and all accesses of the PTC entry table. Once a request has been accepted, the logic of the MEMOP state machine 114 decodes the request and sends control signals to CAS and RAS control PAL's (programmable array logic) (not shown) to indicate when to strobe signals for the memory array 30. In addition, the MEMOP state machine 114 indicates to the receive interface (not shown) when read data from the memory 30 is ready to load into the staging registers 122, and indicates to the CAMPhyAdr 74, 76, 78, 80 when data from the PTC entry table 92 is ready to load for CAMPhyAdr updates. The MEMOP state machine 114 arbitrates between requests for memory refresh and requests for memory accesses from external requesters. The MEMOP state machine 114 stops operation only in a start or idle state 710 (FIG. 7).

Referring to FIG. 7, the MEMOP state machine 114 will cycle 711 to remain in the start state 710 as long as either (1) the MEMOP state machine is not yet ready to initiate a new operation (indicated by MemOpRdy*=-true), such as when the MEMOP state machine is already engaged with a conflicting operation or when initiation of an operation in the MEMOP state machine would conflict with operation of another state machine, or (2) when the requested operation is for a diagnostic write (RqOp=DiagWrite). The MEMOP state machine will remain in the start state 710 during refresh cycles (described below).

From the idle or start state 710, the MEMOP state machine 114 can undergo a transition to one of four states. In a memory read request with CAM hit, the initial transition is to the MEMRd1 state 712. In a memory write request with CAM hit, the initial transition is to the MEMWr1 state 714. In a PTC write request, the initial transition is to the PTCWr1 state 716. A fourth state, PTCRd1 718, is used in connection with a CAM miss, a PTC read request, or a diagnostic read request. Transition to any of these four initial states requires that the MEMOP state machine 114 be ready (i.e., MemOpRdy=true).

The operation of the MEMOP state machine 114 during a read request with CAM hit corresponds generally to the memory operation discussed above in connection with FIG. 3. As depicted in FIG. 7, when the request being honored is a read request (i.e., RqOp=-MemRead), and there has been a CAM hit indication (i.e., AnyCAMHit=true) 720 from one of the four comparators 102, 104, 106, 108, the MEMOP 114 enters the state MEMRd1 712. During MEMRd1, look-up of data in the DRAM is initiated. After engagement of the incrementer 88a, 88b, CAS is asserted. MEMOP 114 then undergoes transition to the state MEMRd2 722. During this state, the first cycle of memory read access is completed, i.e., the first group of four words is transferred to the MEMRd registers 116. Transition from MEMRd2 depends upon several factors. If the receive machine is non-idle, indicated by the signal RcvIdle* being "true" 724, the MEMOP machine will remain in MemRd2 722 for one cycle. The signal MemRd2R* indicates that MEMOP 114 is in state MemRd2 for the first cycle. On the next cycle (MemRd2R=true), if RcvIdle* is still true 726, then MEMOP 114 will return to the start state 710 and attempt to read again.

If the receive machine 112 is idle (RcvIdle=true), the transition from MemRd2 depends upon which type of read request was made. A first type of read request, termed "Read 2," results in the transfer of two words. The second type of read request, termed "Read 8," transfers up to eight words back to the requester. Read 8 is typically used in connection with a cache fill operation. If the request was for a Read 2 operation, this will be indicated by RqOp<3>=true 728. In this case, MemRd2 722 will undergo a transition to the start state 710. If the request was for a Read 8 (RqOp<3>*=-true), the transition is to the "Precharge" state 734. This state is an intermediate state in which CAS is deasserted, while the addresses for the memory 30 settle to a new value. Precharge 734 undergoes a transition to MemRd3 736. During MemRd3 736, CAS is asserted for access of the second half of the read data. MemRd3 736 undergoes transition to MemRd4 738 to complete transfer of the second group of four words (i.e., the second half of the read data). MemRd4 738 undergoes transition to the start state 710.

The second operation of the MEMOP machine 114 involves writing data to memory. This operation of the state machine, corresponds generally to the procedure discussed above in connection with FIG. 4. From the start state 710, MEMOP 114 will undergo transition to MemWr1 714 when there has been a memory write request (RqOp=Mem Write) with a CAM hit 742. During MemWr1 714, the write enable signal is asserted to all DRAM's. The CAS signal is unasserted while addresses to the DRAM's settle. From the MemWr1 state 714, MEMOP 114 undergoes a transition to MemWr2 744. During this state, memory write operations are completed. The write enable remains asserted to all DRAM's and CAS is asserted. Transition from the MemWr2 state 744 depends upon whether there is, pending, a second write request. When there is no CAM hit or if MEMOP is not ready, or if there was no pending write request (RqOp<>MemWrite) 746, MemWr2 744 undergoes transition to the start state 710. If there is a CAM hit, MEMOP 114 is ready, and there is a pending write request (RqOP=MemWrite) 748, MemWr2 undergoes a transition to MemWr1 714.

The third operation of the MEMOP 114 is a request to write to the PTC entry 92, such as when the PTC entry 92 is to be updated. As seen in FIG. 7, the MEMOP 114 will undergo a transition to PTCWr1 716 if there has been a PTC write request (RqOp=PTC-Write) 752. Thereafter, MEMOP 114 will invariably undergo transitions successively to states PTCWr2 754, PTCWr3 756, PTCWr4 758, and PTCWr5 762, whereupon MEMOP 114 will return to the start state 710. In PTCWr1, the CAM's are invalidated at the end of the cycle. The PTC write enable becomes active during this cycle. During PTCWr2 754, PTC write enable becomes inactive. During PTCWr3 756, the PTC address is changed from bank 0 to bank 1 so that the second bank 92b will be written with write data during PTCWr4 758 and PTCWr5 762. During PTCWr4 758, PTC write enable becomes active, and during PTCWr5 762, PTC write enable becomes inactive.

The final operation of MEMOP 114 occurs during a CAM miss (AnyCAMHit, and RqOp<0>), generally as depicted in FIG. 5, or during a PTC read request (RqOp=PTCRd) or a diagnostic read request (RqOp=DiagRd). Under any of these conditions 764, as depicted in FIG. 7, there is a transition of the MEMOP state machine 114 to PTCRd1 718. The MEMOP 114 undergoes successive transitions to PTCRd2 768 and PTCRd3 772. In the described embodiment, PTC access is relatively slow, largely because the PTC entry device 92 is a slow access device. Accordingly, three cycles 718, 768, 772 are needed to complete the access. However, since a CAM miss will not occur on every memory access, such occasional slow access does not seriously degrade overall performance. If the request was either a PTC read request or a diagnostic read request 766, MEMOP 114 undergoes transition from PTC Rd3 to the start state 710. In the case of a CAM miss 774, PTCRd3 772 undergoes transition to PTCRd4 776. During PCRd4, PTC parity errors are checked. If there is no parity error 778, PTCRd4 776 will undergo transition to the start state 710. If there is a PTC parity error in PTC bank 0, 782 of either functional unit (MU0PTCParErr or MU1PTCParErr), the operation is a Read 2, Read 8, Write 1, or Write 2 operation (RqOp=00xx), and the PTC array is not being bypassed (PTCArrayBypass, used principally during board testing), access to bank 1 of the PTC will be attempted. An access of bank 1 occurs during three cycles, PTCRd5 784, PTCRd6 786, and PTCRd7 788.

The receive state machine 112 handles the transfer of read data from the memory board to the selected requester. It controls the loading of the RDData registers 122 along the read-data path. It also selects words for ECC correction 120 during memory reads. The receive state machine 112 has two types of operation: Read 2-type and Read 8-type. The Read 2 operations transfer two words, while the Read 8 operations transfer up to eight words back to the requester. The receive state machine 112 will remain in the idle state 792 if the MemRd register 116 is not loaded (LdMemRdLo*) or the operation is a Read 8 operation (RqOp=Read8), provided the data in the MemRd register 116 is not yet indicated as valid (MemRDVld*).

During the Read 2 operation (indicated by RqOp<>Read8), the receive machine 112 will undergo a transition from the idle state 792 to ECCRd2 794 when valid data has been loaded into 0:1 of the MemRd register 116 by the MEMOP 114 state machine (indicated by MemRdVld=true or LDMemRdLo =true) 796. In the ECCRd2 794 state, the receive state machine 112 is performing ECC correction. ECCRd2 794 undergoes transition to TRd2 798. In the TRd2 state 798, data obtained in accordance with a MemRd2, PTC Read, or Diagnostic Read, as discussed above, is transferred to the requester. The receive state machine 112 remains in this state 798 as long as Rcv and LRcv are unasserted (Rcv* and LRcv*=true) 802. Rcv indicates that a receiver is initiating receipt of data. LRcv indicates that a receiver is initiating receipt of the last portion of data which was requested. When either LRcv or Rcv is true 804, the machine undergoes a transition to the idle state 792.

For a Read 8 operation, the receive state machine 112 will undergo a transition from the idle state 792 to ECCRd8 808 when a Read 8 request is pending (RqOp=Read8) and there is valid data in 0:1 of the MEMRd register 116 (i.e., MemRDVld=true) 806. In ECCRd8 808, the receive machine 112 performs ECC correction and checking on data in 0:1 of MEMRd 116. Transfer of the read data to the requester occurs by way of four transfers of double-word data. These four transfers occur, respectively, during states T1 810, T2 812, T3 814, and T4 816. In each of these four states, T1 T2, T3, and T4, the state machine will stay in the respective state as long as neither Rcv nor LRcv is asserted 818, 822,824,842. Asserting LRcv during T1, T2, T3, or T4 826, 828, 832, 844 will cause an immediate transition to the idle state 792. When Rcv is asserted during the T1, T2, or T3 states 834, 836, 838, the receive machine 112 will undergo transition to the next successive state. Once the machine 112 reaches state T4 816, it will wait in this state 842 until the requester asserts Rcv or LRCv 844. The receive state machine 112 then undergoes a transition to the idle state 792.

The refresh state machine 115, whose states are depicted in FIG. 9, accomplishes two tasks. First, the refresh state machine 115 controls the RAS and CAS controls of the DRAM array. In this mode, the refresh state machine is under the control of the MEMOP state machine 114. The second task of the refresh state machine is to handle CAS-before-RAS refreshes of the DRAM. In this mode, the refresh state machine controls the RAS and CAS signals. A 12-bit count-down counter (not shown) with a scannable reset value of between 256 and 4096 (in multiples of 256 cycles) triggers a single refresh request each time it rolls over. Each such request causes the refresh machine to recycle selectably through either four or eight CAS before RAS refreshes prior to returning to an idle state 852. When the refresh machine 115 is not idle, memory requests cannot be processed. Thus, there are handshake signals between the MEMOP machine 114 and the refresh machine 115 to ensure that one of the two machines is always idle.

A signal which initiates the refresh cycle, termed "Refresh Go," 854 is issued when the refresh counter indicates that a refresh cycle is required and after proper handshake protocol from the MEMOP state machine 114. Until this signal is issued 853, the refresh state machine 115 remains in the idle state 852. The Refresh Go signal 854 causes a transition to a pause state 856. During pause 856, all RAS and CAS lines are deasserted. Next, the refresh state machine loops through states Rfsh1 858, Rfsh2 862, Rfsh3 864, Rfsh4 866, and Rfsh5 868.

The number of loops through states Rfsh1-Rfsh5 is kept track of RfshRowCtr. Preferably, the machine cycles through four refreshes, as depicted in FIG. 9, or eight refreshes. The description below relates to the four-cycle option. As will be apparent to those skilled in the art, the eight-cycle scheme will be similar, but with the conditions on Rfsh5 872, 874 set to 7, rather than 3. In each loop, RAS and CAS are deasserted during Rfsh1 858, CAS is asserted and RAS is deasserted during Rfsh2 862, and RAS and CAS are both asserted during Rfsh3 864, Rfsh4 866, and Rfsh5 868.

Following the last loop 874, Rfsh5 868 undergoes transition to a wait state 876. If the Run Mode signal is deasserted (RunMode*=true), the refresh state machine will either remain in the wait state 876, if Refresh Go is unasserted 878, or will return to the Rfsh1 state 858 if Refresh Go is asserted 882. RunMode is used to ensure that an operation, once begun, is finished. The wait state 876 allows the address latches time to resolve themselves for the first block's row address, so that when RAS is reasserted (during RASRestore 892), the latches in the DRAM devices will contain that information which the CamPhyAdr and CAMTag registers indicate they have. When Run Mode is asserted 884, following the wait state 876, there is a transition to the latch state 886. The latch state 886 provides set-up time for the address latches to drive the address lines so that the CAMTag registers 92, 94, 96, 98 and CAMPhyAdr registers 72, 74, 76, 78 can be revalidated.

Following the latch state 86, there is a transition to the RAS restore state 892. During RAS restores 892, RAS is asserted to one of the four blocks of memory 32, 34, 36, 38, resulting in a reload of one of the four row address latches 42, 44, 46, 48. The latch-RAS restore cycle is repeated four times, counted by RfshRowCtr 894, once for each row address latch.

A number of variations and modifications of the described invention can also be used. As will be apparent to those skilled in the art, certain ideas disclosed herein can be used independently of other ideas disclosed herein, or in various combinations therewith. A memory can be provided in forms other than fast page mode, such as static column mode DRAM, and can be provided with more or fewer than four blocks of memory. In general, larger numbers of memory blocks (each having a corresponding CAMTag and CAMPhyAdr) are effective to avoid or reduce thrashing, but require more complicated and expensive hardware and software. The mapping between the CAMTags and the memory can be a direct mapping, a set associative mapping, or a fully associative mapping. The invention can be used in the context of other memory hierarchies, and is not limited to situations in which reads are conducted to perform a cache fill. The present invention can also be used in a system which has no memory hierarchy, but, rather, has access of a single level of memory. The invention can be used with memory sizes and address widths other than those described. The invention can be used with an interleave system other than the referenced four-way pseudo interleave, or with no interleave system at all. In some embodiments of the invention, it is possible to avoid updating a row address latch following a CAMTag miss if the CAMTag miss was caused only by non-identity of the column bits stored in the CAMTag with corresponding portions of the address request, as shown in FIG. 1F.

With reference to FIG. 5, it is possible to eliminate the delay 562 in order to take advantage of the savings in time, which occurs when no virtual-to-physical translation is needed. It is possible to initiate a read/write operation immediately after the reassertion of RAS 578 and switching of the multiplexer 580, rather than retrying the memory access 582, for example, by initiating the step of determining which bank the CAS is to be asserted on, as depicted in FIG. 3 at 324, or in FIG. 4 at 424. Although all six row/column multiplexers are switched to "row" 572, it is possible to switch only those row/column multiplexers which are needed in order to load the new row address into a selected row address latch.

Although the refresh cycle preserves locality information, as described above, it is possible to reinitialize the memory system following a refresh.

In the present invention, there is some increase in power consumption, because of the high percentage of time during which the RAS is asserted. It is thus possible to deassert RAS for a larger percentage of the time to reduce power consumption, although at the cost of a decrease in efficiency.

Although the present invention has been described with reference to a preferred embodiment and certain modifications and variations thereof, other modifications and variations can also be practiced, as will be apparent to those skilled in the art, the invention being described by the following claims.

What is claimed is:

1. A computer memory system capable of receiving a plurality of virtual or physical address requests, comprising:

a row and column-addressable random access memory having at least one row address latch capable of indicating a plurality of memory locations, all of said indicated memory locations having a common physical row address;

at least a first register for storing at least portions of a row address corresponding to said common physical row address during at least a first and a second of said plurality of address requests, wherein the contents of said first register comprises at least portions of a virtual address during a first time period and at least portions of a physical address, different from said virtual address, during a second time period said second time period being different from said first time period; and a comparator for receiving at least portions of an address request and for comparing said at least portions of an address request to at least portions of said first register to determine whether the memory location indicated by said address request is included in said plurality of memory locations wherein said at least portions of an address request comprises at least portions of one of said plurality of virtual or physical address requests and wherein said comparitor is used to compare said at least portions of an address request to said at least portions of said first register when said one of said plurality of virtual or physical address requests is a virtual address request and wherein said comparitor is also used to compare said at least portions of an address request to said at least portions of said first register when said one of said plurality of virtual or physical address requests is a physical address request.

2. A memory system, as claimed in claim 1, further comprising at least a second storage register for storing at least portions of said common physical row address.

3. A memory system, as claimed in claim 1, wherein said random access memory has a plurality of row address latches and wherein each of said plurality of row address latches is associated with a register for storing a row address selected from the group consisting of a physical address and a virtual address.

4. A memory system, as claimed in claim 1, wherein said memory system includes at least two functional units, and wherein at least one functional unit comprises means for determining whether the requested address resides on said one functional unit.

5. A computer memory system as claimed in claim 1, further comprising:
   means for distinguishing between said virtual and physical address requests; and
   means for setting a first digital bit to indicate whether said first address request is virtual or physical.

6. A computer memory system, as claimed in claim 5, further comprising:
   means for setting a second digital bit to indicate whether said second address request is virtual or physical; and
   a comparator for comparing said second digital bit with said first digital bit.

7. A memory system, as claimed in claim 5, wherein said means for storing said first digital bit comprises a register, and further comprising means for storing in said register at least portions of the address for said first address request, wherein said address is selected from the group consisting of a physical address and a virtual address.

8. A memory system for accessing memory elements in an array having a first plurality of memory elements in response to a sequential plurality of memory address requests, at least one of said memory address requests having a correspondence with at least one of said first plurality of memory elements, comprising:
   an array of memory elements, each element having an address comprising a first number of row address bits and a second number of column address bits;
   first address register means for holding a third number of column address bits for use in accessing a memory element having an address which includes said third number of column bits, said third number being less than said second number;
   second means, using a fourth number of column address bits, for use in accessing a memory element having an address which includes said fourth number of column address bits, said fourth number being less than said second number;
   third means for providing a number of bits from each of said sequential plurality of memory address requests to said first address register, said provided number being equal to said third number;
   fourth means for continuously maintaining said fourth number of column bits in said second means during at least two of said sequential plurality of memory address requests; and
   fifth means for accessing at least one of said first plurality of memory elements using said third number of column address bits in said first address register means, and said fourth number of column address bits in said second means.

9. A memory system, as claimed in claim 8, wherein said array of memory elements further comprises at least a first row address latch capable of indicating a second plurality of memory elements, said second plurality of memory elements including at least some of said first plurality of memory elements, wherein said first row address latch continuously indicates said second plurality of memory elements at least until a first condition occurs, said first condition occurring at least when one of said plurality of memory address requests has no correspondence with said second plurality of memory elements; and
   said means for maintaining comprises means for maintaining said fourth number of column bits in said second means until at least said first condition occurs.

10. A memory system, as claimed in claim 8, wherein the difference between said second number and said fourth number is 8.

11. A memory system, as claimed in claim 8, wherein said second number equals said third number plus said fourth number.

12. A memory system, as claimed in claim 8, wherein said first number equals 10, said second number equals 10, and said fourth number equals 2.

13. A memory system, as claimed in claim 8, wherein said fourth number is greater than 2.

14. A computer memory system comprising:
   a fast page random access column- and row-organized memory, including first, second, third, and fourth address latches, each row latch for holding an address indicating one row of said memory so that the contents of memory in said row can be rapidly accessed by strobing a CAS signal, said row being specifiable by a row address, each element in said memory array having an address comprising at least 10 row address bits and at least 10 column address bits;
   a first address register for holding at least eight column address bits usable in accessing a memory element in a row indicated by one of said row address latches;
   a first means for holding at least two column address bits usable in accessing a memory element in at least one of said row address latches;
   a memory request register for holding bits comprising the requested addresses of a sequential plurality of requested memory elements, wherein said requested addresses are selected from the group consisting of physical addresses and virtual addresses;
   means for providing eight column address bits from each of said sequential plurality of memory address requests in said memory request register to said first address register;
   first, second, third, and fourth virtual/physical row address registers for holding a row address corresponding to the row held by said first, second, third, and fourth row address latches, respectively, said row address selected from the group consisting of a physical address and a virtual address;
   first, second, third, and fourth physical address registers, each physical address register holding a physical row address corresponding to the row indicated by said first, second, third, and fourth row address latches, respectively, and also holding at least two column address bits corresponding to a column address usable in accessing a memory element having a column address which includes said two column address bits;

a comparator for comparing at least a first plurality of bits from an address in said memory request register to the contents of each of said first, second, third, and fourth virtual/physical address registers, and for generating a first signal when the contents of at least one of said first, second, third, or fourth virtual/physical address registers is identical to said first plurality of bits, and for generating a second signal when the contents of none of said first, second, third, or fourth virtual/physical address registers are identical to said first plurality of bits;

third means for continuously maintaining said two column bits in said first means during at least two of said plurality of memory address requests, until said second signal is generated;

fourth means for changing the contents of at least one of said first, second, third or fourth row address latches following generation of said second signal; and fifth means for determining whether said memory request address is a virtual address or a physical address, and for setting at least one bit in said memory request register to indicate whether said memory request address is a virtual address or a physical address.

15. Apparatus for translating at least one of a plurality of virtual addresses to a corresponding physical address, comprising:

a first table having a plurality of entries, each entry containing data for translating a virtual address to a physical address;

a second table containing a plurality of entries;

means for making a corresponding change to said second table whenever there is a change made to said first table, wherein said second table is substantially identical to said first table;

means for detecting an error condition in said first table;

means for translating a virtual address to a physical address using only said first table, and without using said second table, during a period when no errors have been detected by said means for detecting an error; and means for selecting said second table for use by said means for translating and for discontinuing use of said first table when an error condition is detected by said means for detecting.

16. A computer memory system as claimed in claim 1, further comprising:

a plurality of memory functional units, each functional unit for storing a plurality of pages of memory;

a page table cache comprising a plurality of page table cache entry arrays and at least a first page table cache tag array, each of said page table cache entry arrays associated with one of said memory functional units for storing physical addresses residing on said functional unit, said page table cache tag array for storing indications of virtual addresses, each virtual address indication corresponding to a physical address stored in a page table entry array, wherein said first page table cache tag array includes at least a first indication of a virtual address corresponding to a physical address stored in a first of said plurality of page table entry arrays and a second indication of a virtual address corresponding to a physical address stored in a second of said plurality of page table entry arrays.

17. A memory system, as claimed in claim 16, wherein said first page table cache tag array stores indications of virtual addresses for memory locations containing data, and further comprising a second page table cache tag array for storing indications of virtual addresses for memory locations containing instructions.

18. A method for accessing memory, comprising:

providing a fast page dynamic random access memory array having at least one row address latch;

providing at least a first virtual/physical address register for holding at least a portion of a row address corresponding to a row held by at least a first row address latch wherein the contents of said first virtual/physical address register comprises at least portions of a virtual address during a first time period and at least portions of a physical address, different from said virtual address, during a second time period said second time period being different from said first time period;

comparing at least some selected bits from a memory request address with the contents of said virtual/physical address register, generating a first signal when said selected bits are identical, and generating a second signal when said selected bits are not identical wherein said memory request address comprises one of a plurality of virtual or physical address requests and wherein said comparing comprises comparing said at least some selected bits from said memory request address to the contents of said virtual/physical address register when said one of said plurality of virtual or physical address requests is a virtual address request and wherein said comparing comprises comparing said at least some selected bits from said memory request address to the contents of said virtual/physical address register when said one of said plurality of virtual or physical address request is a physical address request. ; and asserting a column address strobe to said row address latch following said first signal.

19. A method, as claimed in claim 18, wherein:

said step of providing a memory array comprises providing a plurality of row address latches;

said step of providing virtual/physical address registers comprises providing one virtual/physical address register for each row address latch;

said step of comparing comprises comparing said selected bits to the contents of each of said plurality of virtual/physical registers, and generating a third signal when no contents of said virtual/physical registers are equal to said selected bits; and further comprising changing the contents of at least a first row address latch in response to said third signal.

21. A method, as claimed in claim 20, further comprising:

determining whether each of said sequential plurality of memory address requests is virtual or physical;

setting at least a first bit to indicate whether each of said memory address request is virtual or physical;

wherein said step of accessing a memory element includes using said set bit indicating whether said memory address request is virtual or physical.

20. A method for sequentially accessing a plurality of memory elements in a memory array in response to a sequential plurality of memory address requests, comprising:

provloding an array of memory elements, each element having an address comprising a first number of row bits and a second number of column bits;

providing first address register means for holding a third number of column address bits for use in accessing a memory element having an address which includes said third number of column address bits, said third number being less than said second number;

providing second means, using a fourth number of column address bits, for use in accessing a memory element having an address which includes said fourth number of column address bits, said fourth number being less than said second number;

transmitting a number of bits from each of said sequential plurality of memory address requests to said first address register, said number of transmitted bits being equal to said third number;

continuously maintaining said fourth number of column address bits in said means during at least two of said plurality of memory address requests; and accessing a memory element using said third number of bits in said first address register means and said fourth number of bits in said second means.

22. A computer memory system, as claimed in claim 1, further comprising:

a first table having a plurality of entries, each entry containing data for translating a virtual address to a physical address;

a second table containing a plurality of entries;

means for making a corresponding change to said second table whenever there is a change made to said first table, wherein said second table is substantially identical to said first table;

means for detecting an error condition in said first table;

means for selectably using one of said first table and second table to translate a virtual address to a physical address; and means for selecting said second table for use by said means for selectably using when an error condition is detected by said means for detecting.

* * * * *